United States Patent
Williams et al.

(10) Patent No.: US 11,396,576 B2
(45) Date of Patent: *Jul. 26, 2022

(54) ORIENTED FILMS AND SHRINK FILMS COMPRISING POLYESTERS WHICH COMPRISE TETRAMETHYLCYCLOBUTANEDIOL AND ETHYLENE GLYCOL

(71) Applicant: Eastman Chemical Company, Kingsport, TN (US)

(72) Inventors: James Carl Williams, Blountville, TN (US); James Wesley Peer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 613 days.

This patent is subject to a terminal disclaimer.

(21) Appl. No.: 16/326,287

(22) PCT Filed: Aug. 17, 2017

(86) PCT No.: PCT/US2017/047382
§ 371 (c)(1),
(2) Date: Feb. 18, 2019

(87) PCT Pub. No.: WO2018/035345
PCT Pub. Date: Feb. 22, 2018

(65) Prior Publication Data
US 2019/0211146 A1 Jul. 11, 2019

Related U.S. Application Data

(60) Provisional application No. 62/546,185, filed on Aug. 16, 2017, provisional application No. 62/546,320, (Continued)

(51) Int. Cl.
*C08G 63/183* (2006.01)
*C08J 5/18* (2006.01)
(Continued)

(52) U.S. Cl.
CPC .......... *C08G 63/183* (2013.01); *B29C 55/005* (2013.01); *B29C 55/08* (2013.01); *B29C 55/12* (2013.01); *B29C 55/18* (2013.01); *B32B 27/08* (2013.01); *B32B 27/12* (2013.01); *B32B 27/18* (2013.01); *B32B 27/205* (2013.01); *B32B 27/22* (2013.01); *B32B 27/36* (2013.01); *C08G 63/199* (2013.01); *C08G 63/85* (2013.01); *C08J 5/18* (2013.01); *B29K 2067/00* (2013.01); *B32B 2262/02* (2013.01); *B32B 2262/101* (2013.01); *B32B 2262/106* (2013.01); *B32B 2264/10* (2013.01); *B32B 2307/3065* (2013.01); *B32B 2307/40* (2013.01); *B32B 2307/41* (2013.01); *B32B 2307/71* (2013.01);
(Continued)

(58) Field of Classification Search
CPC ..... C08L 67/02; C08G 63/183; C08G 63/199; C08G 63/83; C08G 63/85; B29C 55/005; B29C 55/08; B29C 55/12; B29C 55/18; B29K 2067/00; C08J 2367/02; C08J 5/18; B32B 2262/02; B32B 2262/101; B32B 2262/106; B32B 2264/10; B32B 2307/3065; B32B 2307/40; B32B 2307/41; B32B 2307/71; B32B 2307/732; B32B 2419/04; B32B 2425/00; B32B 2439/70; B32B 2439/80; B32B 2457/12; B32B 2519/00; B32B 27/08; B32B 27/12; B32B 27/18; B32B 27/205; B32B 27/22; B32B 27/36
See application file for complete search history.

(56) References Cited

U.S. PATENT DOCUMENTS 2,720,507 A  10/1955 Caldwell
3,249,652 A   5/1966 Quisenberry
(Continued)

FOREIGN PATENT DOCUMENTS

CA      740050 A    8/1966
EP    0 214 859 A2  3/1987
(Continued)

OTHER PUBLICATIONS

UPSTO Office Action dated Oct. 26, 2020 received in co-pending U.S. Appl. No. 16/326,297.
USPTO Office Action dated May 27, 2020 received in co-pending U.S. Appl. No. 16/326,292.
USPTO Office Action dated Nov. 4, 2020 received in co-pending U.S. Appl. No. 16/326,292.
USPTO Office Action dated Nov. 5, 2020 received in co-pending U.S. Appl. No. 16/326,283.
(Continued)

*Primary Examiner* — Ling Siu Choi
*Assistant Examiner* — Gennadiy Mesh
(74) *Attorney, Agent, or Firm* — Tammye L. Taylor Polk

(57) ABSTRACT

An oriented film or a shrink film comprising a polyester composition which comprises at least one polyester which comprises: a dicarboxylic acid component comprising: about 90 to about 100 mole % of terephthalic acid residues; about 0 to about 10 mole % of aromatic and/or aliphatic dicarboxylic acid residues having up to 20 carbon atoms; and a glycol component comprising: about 10 to about 29 mole % 2,2,4,4-tetramethyl-1,3-cyclobutanediol residues; and about 71 to about 90 mole % ethylene glycol residues; and optionally, diethylene glycol residues; wherein the total mole % of the dicarboxylic acid component is 100 mole %, and wherein the total mole % of the glycol component is 100 mole %; wherein the inherent viscosity of the polyester is from 0.50 to 0.8 dL/g.

15 Claims, 1 Drawing Sheet

Related U.S. Application Data filed on Aug. 16, 2017, provisional application No. 62/546,189, filed on Aug. 16, 2017, provisional application No. 62/546,328, filed on Aug. 16, 2017, provisional application No. 62/520,214, filed on Jun. 15, 2017, provisional application No. 62/520,211, filed on Jun. 15, 2017, provisional application No. 62/376,557, filed on Aug. 18, 2016, provisional application No. 62/376,473, filed on Aug. 18, 2016.

(51) Int. Cl.

| | | |
|---|---|---|
| C08G 63/199 | (2006.01) | |
| B29C 55/00 | (2006.01) | |
| B29C 55/18 | (2006.01) | |
| B32B 27/18 | (2006.01) | |
| B32B 27/08 | (2006.01) | |
| B32B 27/12 | (2006.01) | |
| B32B 27/36 | (2006.01) | |
| B32B 27/20 | (2006.01) | |
| B32B 27/22 | (2006.01) | |
| B29C 55/08 | (2006.01) | |
| B29C 55/12 | (2006.01) | |
| C08G 63/85 | (2006.01) | |
| B29K 67/00 | (2006.01) | |
| C08G 63/83 | (2006.01) | |
| C08K 5/00 | (2006.01) | |
| C08K 5/521 | (2006.01) | |

(52) U.S. Cl.
CPC ..... B32B 2307/732 (2013.01); B32B 2419/04 (2013.01); B32B 2425/00 (2013.01); B32B 2439/70 (2013.01); B32B 2439/80 (2013.01); B32B 2457/12 (2013.01); B32B 2519/00 (2013.01); C08G 63/83 (2013.01); C08J 2367/02 (2013.01); C08K 5/005 (2013.01); C08K 5/521 (2013.01)

(56) References Cited

U.S. PATENT DOCUMENTS

| | | |
|---|---|---|
| 3,313,777 A | 4/1967 | Elam et al. |
| 3,426,754 A | 2/1969 | Bierenbaum et al. |
| 3,772,405 A | 11/1973 | Hamb |
| 3,907,754 A | 9/1975 | Tershansy et al. |
| 3,944,699 A | 3/1976 | Mathews et al. |
| 3,962,189 A | 6/1976 | Russin et al. |
| 4,010,145 A | 3/1977 | Russin et al. |
| 4,138,459 A | 2/1979 | Brazinsky et al. |
| 4,263,425 A | 4/1981 | Rothe et al. |
| 4,582,752 A | 4/1986 | Duncan |
| 4,632,869 A | 12/1986 | Park et al. |
| 4,745,174 A | 5/1988 | Pruett et al. |
| 4,770,931 A | 9/1988 | Pollock et al. |
| 5,017,680 A | 5/1991 | Sublett |
| 5,106,944 A | 4/1992 | Sublett |
| 5,176,954 A | 1/1993 | Keller et al. |
| 5,372,864 A | 12/1994 | Weaver et al. |
| 5,384,377 A | 1/1995 | Weaver et al. |
| 5,435,955 A | 7/1995 | Kamei et al. |
| 5,654,347 A | 8/1997 | Khemani et al. |
| 5,688,899 A * | 11/1997 | Strand ............... C08G 63/6856 528/275 |
| 5,696,176 A | 12/1997 | Khemani et al. |
| 5,705,575 A | 1/1998 | Kelsey |
| 5,843,578 A | 12/1998 | Sasaki et al. |
| 5,859,116 A * | 1/1999 | Shih ..................... C08J 5/18 524/493 |
| 5,955,565 A | 9/1999 | Morris et al. |
| 5,989,663 A | 11/1999 | Morris et al. |
| 5,998,005 A | 12/1999 | Kanno |
| 6,004,664 A | 12/1999 | Sasaki et al. |
| 6,068,910 A | 5/2000 | Flynn et al. |
| 6,096,854 A | 8/2000 | Morris et al. |
| 6,187,898 B1 | 2/2001 | Wagner et al. |
| 6,287,680 B1 | 9/2001 | Sasaki et al. |
| 6,500,533 B1 | 12/2002 | Kong et al. |
| 6,500,915 B1 | 12/2002 | Fujimori et al. |
| 6,551,688 B2 | 4/2003 | Moskala et al. |
| 6,559,272 B1 | 5/2003 | Jeon et al. |
| 6,632,390 B1 | 10/2003 | Shelby et al. |
| 6,649,731 B2 | 11/2003 | Hori et al. |
| 6,667,383 B2 | 12/2003 | Fujimori et al. |
| 6,720,085 B2 | 4/2004 | Ito et al. |
| 6,777,099 B2 | 8/2004 | Tano et al. |
| 6,787,630 B1 | 9/2004 | Dominguez de Walter et al. |
| 6,998,463 B2 | 2/2006 | Fujimori et al. |
| 7,030,181 B2 | 4/2006 | Moskala et al. |
| 7,084,234 B2 | 8/2006 | Wilhelm et al. |
| 7,235,623 B2 | 6/2007 | Strand et al. |
| 7,300,999 B2 | 11/2007 | Deiss et al. |
| 7,332,564 B2 | 2/2008 | Fujimori et al. |
| 7,354,653 B2 | 4/2008 | Germroth et al. |
| RE40,571 E | 11/2008 | Ohmatsuzawa et al. |
| 7,772,362 B2 | 8/2010 | Beall et al. |
| 7,834,128 B2 | 11/2010 | Fujimori et al. |
| 8,071,695 B2 | 12/2011 | Strand et al. |
| 9,169,388 B2 | 10/2015 | Germroth et al. |
| 9,315,653 B2 | 4/2016 | Takegami |
| 11,072,684 B2 * | 7/2021 | Crawford ............. C08G 63/199 |
| 11,091,586 B2 * | 8/2021 | Crawford ............. C08G 63/183 |
| 2001/0036545 A1 | 11/2001 | Nishi et al. |
| 2003/0068453 A1 | 4/2003 | Kong |
| 2003/0165671 A1 | 9/2003 | Hashimoto et al. |
| 2003/0170427 A1 | 9/2003 | Ito et al. |
| 2005/0096453 A1 | 5/2005 | Flynn et al. |
| 2005/0113556 A1 | 5/2005 | Strand et al. |
| 2006/0094858 A1 | 5/2006 | Turner et al. |
| 2006/0121219 A1 | 6/2006 | Shelby et al. |
| 2007/0142511 A1 | 6/2007 | Crawford |
| 2007/0142615 A1 | 6/2007 | Crawford |
| 2009/0227735 A1 * | 9/2009 | Shih ..................... C08J 5/18 525/190 |
| 2014/0162042 A1 | 6/2014 | Shih et al. |
| 2014/0221599 A1 | 8/2014 | Hishimoto et al. |

FOREIGN PATENT DOCUMENTS

| | | | |
|---|---|---|---|
| EP | 0 581 970 B1 | 8/1998 | |
| JP | S5523136 A | 2/1980 | |
| JP | 61 037827 A | 2/1986 | |
| JP | 63 193822 A | 8/1988 | |
| JP | 11 158358 A | 6/1999 | |
| JP | 2002 053740 A | 2/2002 | |
| JP | 2002 121362 A | 4/2002 | |
| JP | 2003 128894 | 5/2003 | |
| JP | 3423062 B2 | 7/2003 | |
| JP | 2004 181863 A | 7/2004 | |
| JP | 3582887 B2 | 8/2004 | |
| WO | WO 99 47605 A1 | 9/1999 | |
| WO | WO 2002 28967 A1 | 4/2002 | |
| WO | WO 2008 051320 A1 | 5/2008 | |
| WO | WO 2008 051321 A1 | 5/2008 | |

OTHER PUBLICATIONS

USPTO Office Action dated Jun. 1, 2021 received in co-pending U.S. Appl. No. 16/326,283.
USPTO Office Action dated Sep. 10, 2021 received in co-pending U.S. Appl. No. 16/326,283.
UPSTO Notice of Allowance dated Mar. 18, 2021 received in co-pending U.S. Appl. No. 16/326,292.
USPTO Notice of Allowance dated Apr. 1, 2021 received in co-pending U.S. Appl. No. 16/326,292.
USPTO Notice of Allowance dated Apr. 7, 2021 received in co-pending U.S. Appl. No. 16/326,297.
ASTM D256; "Standard Test Methods for Determining the Izod Pendulum Impact Resistance of Plastics"; Published Nov. 2018.
ASTM D790; "Standard Test Methods for Flexural Properties of Unreinforced and Reinforced Plastics and Electrical Insulating Materials"; Published Jul. 2017.

(56) References Cited

OTHER PUBLICATIONS

ASTM D882; "Standard Test Method for Tensile Properties of Thin Plastic Sheeting"; Published Aug. 2018.
ASTM D4440; "Standard Test Method for Plastics: Dynamic Mechanical Properties Melt Rheology"; Published Feb. 2015.
ASTM D6290; "Standard Test Method for Color Determination of Plastic Pellets"; Published Oct. 2018.
ASTM E308; "Standard Practice for Computing the Colors of Objects by Using the CIE System"; Published Sep. 2018.
Bullard, Ralph H., et al.; "Methylphenyl-Stannanes"; Journal of the American Chemical Society, 49(5), 1927, pp. 1369-1373.
Butschli, Jim; "Gauging demand for calendered plastics"; Packaging World, May 31, 1997; retrieved from https://www.packworld.com/article/machinery/fillingsealing/dry-filling/guaging-demand-calendered-plastics on Jun. 18, 2018; 4 pages.
Chambers, Robert F., et al.; "Phenyltin Compounds"; Journal of American Chemical Society, 48(4), 1926, pp. 1054-1062HA.
Clariant International Ltd, "An extensive range of wax additives for engineering resins" / Waxes Overview Publication No. DA 8240 E; May 2013.
Clariant International Ltd, "Licowax OP Flakes, Partly saponified, ester wax"; Product Data Sheet, edition date Sep. 11, 2015, edition No. 8.
Clariant International Ltd, "Licowax S Flakes, acid wax"; Product Data Sheet, edition date May 7, 2015, edition No. 7.
Dealy, John M. and Kim, Seungoh; "Chapter 7 Gross Melt Fracture in Extrusion"; Polymer Processing Instabilities, Control and Understanding; 2005 pp. 207-236.
Fox, T. G.; "J5. Influence of Diluent and of Copolymer Composition on the Glass Temperature of a Polymer System"; Bull. Am. Phys. Soc., 1, 123 (1956).
Kelsey, Donald R., et al.; "High Impact, Amorphous Terephthalate Copolyesters of Rigid 2,2,4,4-Tetramethyl-1,3-cyclobutanediol with Flexible Diols"; Macromolecules, 33; 2000; pp. 5810-5818.
Kocheshkov, K.A.; "Untersuchungen über metallorganische Verbindungen, I. Mitteilung: Eine neue Klasse von Arylzinnverbindungen: Phenyl-trihalogen-stannane"; Berichte der deutschen chemischen Gesellschaft (A and B Series); Issue 4, vol. 62; pp. 996-999 (1929)—Original Language.
Krause, Charles A. and Greer, Willard N.; "The Dimethyltin Group and Some of its Reactions"; Journal of the American Chemical Society, 47(10), 1925, pp. 2568-2575.
Krause, Erich and Grosse, A. V.; "Die Chemie Der Metall—Organischen Verbindungen"; Recent Books; 1937, p. 148; 1937, Gobroder-Borntrager.
Meerwein, Hans and Bersin, Theodor; "Investigation of Metal Alcoholates and Orth acid Esters. I. Alkoxo Acids and Their Salts"; Annalen der Chemie, vol. 476; pp. 113-150; Sep. 20, 1929.
Tadmor, Zehev and Gogos, Costas G.; "Chapter 15.1 The Calendering Process"; Principles of Polymers Processing, Second Edition; pp. 865-866; 2006.
Titow, W. V.; "Calendering of PVC, Chapter 18"; PVC Technology, 4th Edition, pp. 803-848 (1984), Elsevier Publishing Co.
Co-pending U.S. Appl. No. 16/326,297, filed Feb. 18, 2019; Emmett Dudley Crawford.
Co-pending U.S. Appl. No. 16/326,292, filed Feb. 18, 2019; Emmett Dudley Crawford.
Co-pending U.S. Appl. No. 16/326,283, filed Feb. 18, 2019; Marc Alan Strand.
Notification of Transmittal of the International Search Report and the Written Opinion of the International Searching Authority, or the Declaration dated Nov. 7, 2017 received in International Application No. PCT/US2017/047364.
Notification of Transmittal of the International Search Report and the Written Opinion of the International Searching Authority, or the Declaration dated Nov. 7, 2017 received in International Application No. PCT/US2017/047367.
Invitation to Pay Additional Fees and, Where Applicable, Protest Fee dated Nov. 2, 2017 received in International Application No. PCT/US2017/047374.
Notification of Transmittal of the International Search Report and the Written Opinion of the International Searching Authority, or the Declaration dated Feb. 6, 2018 received in International Application No. PCT/US2017/047374.
Notification of Transmittal of the International Search Report and the Written Opinion of the International Searching Authority, or the Declaration dated Nov. 3, 2017 received in International Application No. PCT/US2017/047382.
USPTO Office Action dated Jan. 14, 2022 received in co-pending U.S. Appl. No. 16/326,283.

* cited by examiner

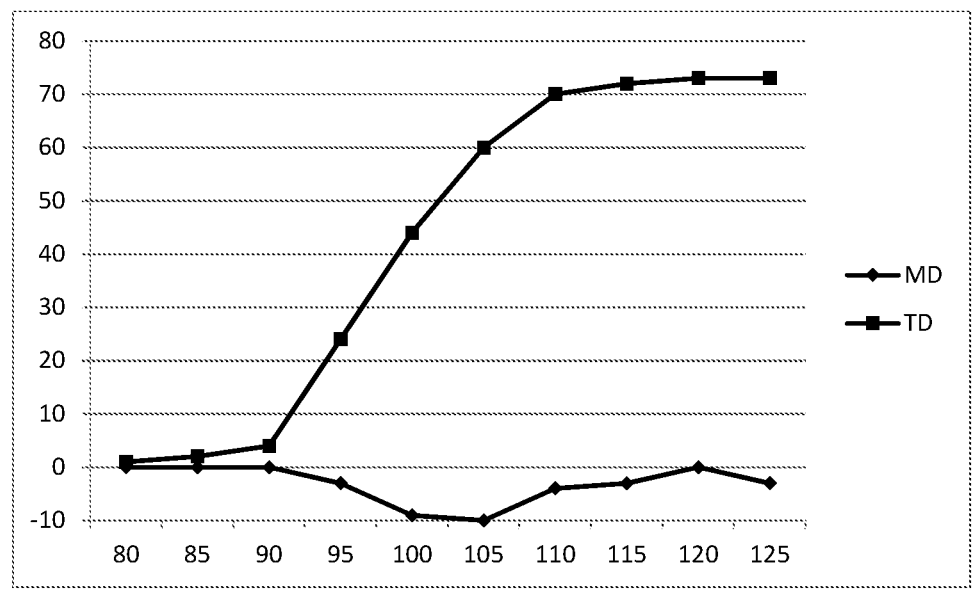
Figure 1 - Polymer F
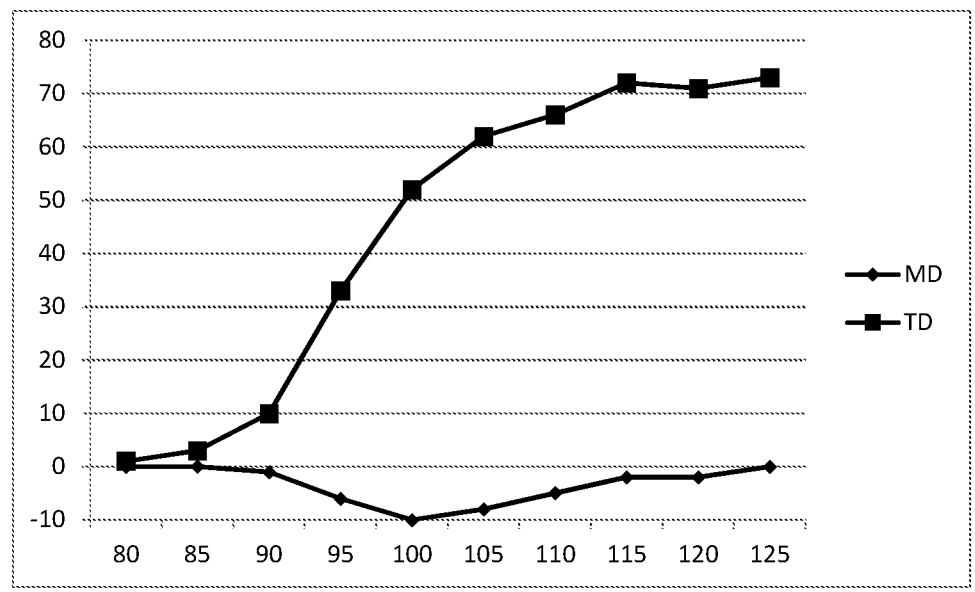
Figure 2 - Polymer J

ORIENTED FILMS AND SHRINK FILMS COMPRISING POLYESTERS WHICH COMPRISE TETRAMETHYLCYCLOBUTANEDIOL AND ETHYLENE GLYCOL

CROSS-REFERENCE TO RELATED APPLICATION(S)

This application is a national stage filing under 35 USC § 371 of International Application Number PCT/US2017/047382, filed on Aug. 17, 2017; which claims the benefit of the filing date to U.S. Provisional Application Nos. 62/546,328, 62/546,320, 62/546,189, and 62/546,185 all filed on Aug. 16, 2017; U.S. Provisional Application Nos. 62/520,214 and 62/520,211 both filed on Jun. 15, 2017; and U.S. Provisional Application Nos. 62/376,557 and 62/376,473 both filed on Aug. 18, 2016; the entire disclosures of which are incorporated by reference herein.

FIELD OF THE INVENTION

The present invention relates to oriented and/or shrink films comprising polyester compositions which comprise residues of terephthalic acid, 2,2,4,4-tetramethyl-1,3-cyclobutanediol (TMCD) and ethylene glycol (EG) in certain compositional ranges having improved characteristics.

BACKGROUND OF THE INVENTION

There is a commercial need for an improved oriented film, for example, oriented film useful in making shrink film where the shrink film has at least one or more of the following properties: higher shrink activation temperatures, good stretching properties, good shrink force, good break stress and strain, good Young's modulus, good shrinkage properties in the transverse direction, good growth in the machine direction, and good ultimate shrinkage (shrinkage at the highest temperature, e.g. 125° C. There is also a need in the art for a shrink film material having a combination of one or more of the above properties. Further, there is a need in the art for polyester films comprising polyester compositions where the films can be stretched or oriented without fracturing, wrinkling, bubbling, breaking, etc.

There is a need in the art as well for shrink films that have certain properties including those above and/or at least one of the following desirable shrink film properties: (1) a relatively higher shrinkage activation temperature, (2) a shrinkage percentage which increases gradually and in a controlled manner with increasing temperature, (3) a higher shrink force but low enough to prevent crushing of the underlying container, (4) a high ultimate shrinkage (for example, 60% or greater in the transverse direction) and (5) film toughness so as to prevent unnecessary fracturing, breaking, tearing, splitting, bubbling, or wrinkling of the film prior to and after shrinkage.

SUMMARY OF THE INVENTION

It has been found that certain TMCD-CHDM (1,4-cyclohexanedimethanol) polyesters are not able to be oriented without fracturing and/or webbing using standard orienting conditions. It has also been found that certain TMCD-EG containing materials are not able to be oriented without fracturing and/or webbing using standard orienting conditions (see the Examples herein).

In one aspect of the invention, it has been found that certain polyesters containing TMCD and EG can produce an oriented film without fracturing, wrinkling, webbing, bubbling, breaking, etc using standard orienting conditions. In another embodiment, it has been found that certain polyesters containing TMCD and EG are useful in making oriented film and/or shrink film from polyesters having a combination of two or more properties selected from good heat resistance, certain notched Izod impact strength, certain densities, certain inherent viscosities, good melt viscosities, certain glass transition temperature (Tg), certain flexural modulus, good clarity, and good color.

In another aspect of the invention, it has been found that certain polyesters containing TMCD and EG can produce an oriented film, for example, oriented film useful in making shrink film where the shrink film has at least one or more of the following properties: higher shrink activation temperatures, good stretching properties, good shrink force, good break stress and strain, good Young's modulus, good shrinkage properties in the transverse direction, good growth in the machine direction, and good ultimate shrinkage (shrinkage at the highest temperature, e.g. at 125° C.

In one aspect of the invention, it has also been found that certain polyesters containing TMCD and EG can produce an oriented film, for example, oriented film useful in making shrink film where the shrink film has certain properties including those above and/or at least one of the following desirable shrink film properties: (1) a relatively higher shrinkage activation temperature, (2) a shrinkage percentage which increases gradually and in a controlled manner with increasing temperature, (3) a higher shrink force but low enough to prevent crushing of the underlying container, (4) a high ultimate shrinkage (for example, 60% or greater in the transverse direction), and (5) film toughness so as to prevent unnecessary fracturing, breaking, tearing, splitting, bubbling, or wrinkling of the film prior to and after shrinkage.

For the ease of reference but not intending to be limiting in any way, certain aspects of the invention are numbered consecutively, as follows.

In aspect 1 of this invention, an oriented film or a shrink film is provided comprising a polyester composition which comprises:
(1) at least one polyester comprising:
 (a) a dicarboxylic acid component comprising:
  (i) about 80 to about 100 mole % of terephthalic acid residues;
  (ii) about 0 to about 20 mole % of aromatic and/or aliphatic dicarboxylic acid residues having up to 20 carbon atoms; and
 (b) a glycol component comprising:
  (i) about 10 to about 42 mole % 2,2,4,4-tetramethyl-1,3-cyclobutanediol residues; and
  (ii) about 58 to about 90 mole % ethylene glycol residues;
  (iii) optionally, diethylene glycol residues; or
 (b) a glycol component comprising:
  (i) about 10 to about 42 mole % 2,2,4,4-tetramethyl-1,3-cyclobutanediol residues; and
  (ii) about 60 to about 90 mole % ethylene glycol residues;
  (iii) less than 30 mole % modifying glycols other than 1,4-cyclohexanedimethanol residues;
  (iv) less than 20 mole % 1,4-cyclohexanedimethanol residues; and
  (v) optionally, diethylene glycol residues; or (b) a glycol component comprising:
  (i) about 14 to about 42 mole % 2,2,4,4-tetramethyl-1,3-cyclobutanediol residues; and
  (ii) about 58 to about 86 mole % ethylene glycol residues.
  (iv) less than 20 mole % 1,4-cyclohexanedimethanol residues; and
  (v) optionally, diethylene glycol residues; and
wherein the total mole % of the dicarboxylic acid component is 100 mole %, and
wherein the total mole % of the glycol component is 100 mole %;
wherein the inherent viscosity of the polyester is from 0.50 to 0.80 dL/g, or 0.50 to 0.70, or 0.55 to 0.68 dL/g as determined in 60/40 (wt/wt) phenol/tetrachloroethane at a concentration of 0.25 g/50 ml at 25° C.;
wherein the polyester has a Tg of from 80° C. to less than 100° C., or from 80° C. to 98° C., as determined using a TA DSC 2920 from Thermal Analyst Instrument at a scan rate of 20° C./min.; and
(2) optionally, wherein the polyester composition comprises at least one plasticizer.

In aspect 2 of this invention, an oriented film or a shrink film is provided comprising a polyester composition which comprises:
(1) at least one polyester comprising:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 5 to about 30 mole % 2,2,4,4-tetramethyl-1,3-cyclobutanediol residues, and
    (ii) about 70 to about 95 mole % ethylene glycol residues; or
    (i) about 10 to about 30 mole % 2,2,4,4-tetramethyl-1,3-cyclobutanediol residues, and
    (ii) about 70 to about 90 mole % ethylene glycol residues; or
    (i) about 15 to about 30 mole % 2,2,4,4-tetramethyl-1,3-cyclobutanediol residues; and
    (ii) about 70 to about 85 mole % ethylene glycol residues; or
    (i) about 15 to about 28 mole % 2,2,4,4-tetramethyl-1,3-cyclobutanediol residues; and
    (ii) about 72 to about 85 mole % ethylene glycol residues; or
    (i) about 15 to about 25 mole % 2,2,4,4-tetramethyl-1,3-cyclobutanediol residues; and
    (ii) about 75 to about 85 mole % ethylene glycol residues; and
    optionally, diethylene glycol residues;
wherein the total mole % of the dicarboxylic acid component is 100 mole %, and
wherein the total mole % of the glycol component is 100 mole %;
wherein the inherent viscosity of the polyester is 0.50 to 0.80 dL/g, or 0.50 to 0.70, or 0.55 to 0.68 dL/g as determined in 60/40 (wt/wt) phenol/tetrachloroethane at a concentration of 0.25 g/50 ml at 25° C.;
wherein the polyester has a Tg of from 80° C. to 105° C., or from 80° C. to 100° C., 80° C. to less than 100° C., or from 80° C. to 99° C., or from 80° C. to 98° C., as determined using a TA DSC 2920 from Thermal Analyst Instrument at a scan rate of 20° C./min.; and
(2) optionally, at least one plasticizer.

In aspect 3 of this invention, an oriented film or a shrink film is provided comprising a polyester composition which comprises:
(1) at least one polyester comprising:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 11 to about 29 mole % 2,2,4,4-tetramethyl-1,3-cyclobutanediol residues;
    (ii) about 71 to about 89 mole % ethylene glycol residues or;
    (iii) optionally, diethylene glycol residues; or
    (i) about 14 to about 29 mole % 2,2,4,4-tetramethyl-1,3-cyclobutanediol residues;
    (ii) about 71 to about 86 mole % ethylene glycol residues;
    (iii) optionally, diethylene glycol residues;
wherein the total mole % of the dicarboxylic acid component is 100 mole %, and
wherein the total mole % of the glycol component is 100 mole %;
wherein the inherent viscosity of the polyester is 0.50 to 0.80 dL/g, or 0.50 to 0.70, or 0.55 to 0.68 dL/g as determined in 60/40 (wt/wt) phenol/tetrachloroethane at a concentration of 0.25 g/50 ml at 25° C.;
wherein the polyester has a Tg of from 80° C. to 105° C., or from 80° C. to 100° C., 80° C. to less than 100° C., or from 80° C. to 99° C., or from 80° C. to 98° C., as determined using a TA DSC 2920 from Thermal Analyst Instrument at a scan rate of 20° C./min.; and
(2) optionally, at least one plasticizer.

In aspect 4 of this invention, an oriented film or a shrink film is provided comprising a polyester composition which comprises:
(1) at least one polyester comprising:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 11 to about 29 mole % 2,2,4,4-tetramethyl-1,3-cyclobutanediol residues;
    (ii) about 59 to about 89 mole % ethylene glycol residues or;
    (iii) less than 30 mole % modifying glycols other than 1,4-cyclohexanedimethanol;
    (iv) less than 20 mole % 1,4-cyclohexanedimethanol residues; and
    (v) optionally, diethylene glycol residues; or
    (i) about 14 to about 29 mole % 2,2,4,4-tetramethyl-1,3-cyclobutanediol residues;
    (ii) about 56 to about 86 mole % ethylene glycol residues;
    (iii) less than 30 mole % modifying glycols other than 1,4-cyclohexanedimethanol;
    (iv) less than 20 mole % 1,4-cyclohexanedimethanol residues; and
    (v) optionally, diethylene glycol residues;

wherein the total mole % of the dicarboxylic acid component is 100 mole %, and
wherein the total mole % of the glycol component is 100 mole %;
wherein the inherent viscosity of the polyester is 0.50 to 0.80 dL/g, or 0.50 to 0.70, or 0.55 to 0.68 dL/g as determined in 60/40 (wt/wt) phenol/tetrachloroethane at a concentration of 0.25 g/50 ml at 25° C.;
wherein the polyester has a Tg of from 80° C. to 105° C., or from 80° C. to 100° C., 80° C. to less than 100° C., or from 80° C. to 99° C., or from 80° C. to 98° C., as determined using a TA DSC 2920 from Thermal Analyst Instrument at a scan rate of 20° C./min.; and
(2) optionally, at least one plasticizer.

In aspect 5 of this invention, an oriented or a shrink film is provided comprising a polyester composition which comprises:
(1) at least one polyester comprising:
   (a) a dicarboxylic acid component comprising:
      (i) about 90 to about 100 mole % of terephthalic acid residues;
      (ii) about 0 to about 10 mole % of aromatic and/or aliphatic dicarboxylic acid residues having up to 20 carbon atoms; and
   (b) a glycol component comprising:
      (i) about 34 to about 38 mole % 2,2,4,4-tetramethyl-1,3-cyclobutanediol residues;
      (ii) about 62 to about 66 mole % ethylene glycol residues; or
      (i) about 34.2 to about 38 mole % 2,2,4,4-tetramethyl-1,3-cyclobutanediol residues;
      (ii) about 62 to about 65.8 mole % ethylene glycol residues;
      (iii) optionally, diethylene glycol residues, and
wherein the total mole % of the dicarboxylic acid component is 100 mole %, and
wherein the total mole % of the glycol component is 100 mole %;
wherein the inherent viscosity of the polyester is 0.50 to 0.70 dL/g, or 0.55 to 0.65 dL/g as determined in 60/40 (wt/wt) phenol/tetrachloroethane at a concentration of 0.25 g/50 ml at 25° C.; and
wherein the polyester has a Tg of from 80° C. to less than 100° C., or from 80° C. to 98° C., as determined using a TA DSC 2920 from Thermal Analyst Instrument at a scan rate of 20° C./min.; and (2) optionally, at least one plasticizer and
(2) optionally, at least one plasticizer.

In aspect 6 of this invention, an oriented film or a shrink film is provided comprising a polyester composition which comprises:
(a) a dicarboxylic acid component comprising:
   (i) about 90 to about 100 mole % of terephthalic acid residues;
   (ii) about 0 to about 10 mole % of aromatic and/or aliphatic dicarboxylic acid residues having up to 20 carbon atoms; and
(b) a glycol component comprising:
   (i) about 10 to about 42 mole % 2,2,4,4-tetramethyl-1,3-cyclobutanediol residues; and
   (ii) about 58 to about 90 mole % ethylene glycol residues; and
   (iii) less than 20 mole % 1,4-cyclohexanedimethanol residues; or
   (i) about 14 to about 42 mole % 2,2,4,4-tetramethyl-1,3-cyclobutanediol residues; and
   (ii) about 58 to about 86 mole % ethylene glycol residues; or
   (i) about 30 to about 42 mole % 2,2,4,4-tetramethyl-1,3-cyclobutanediol residues; and
   (ii) about 58 to about 70 mole % ethylene glycol residues; and
optionally, diethylene glycol residues in the amount of at least 0.80 mole %, or from 0.80 to 10 mole %, or from 0.80 to 8 mole % whether formed during polymerization or intentionally added or both; and
wherein the total mole % of the dicarboxylic acid component is 100 mole %, and
wherein the total mole % of the glycol component is 100 mole %;
wherein the inherent viscosity of the polyester is from 0.50 to 0.80 dL/g, or 0.50 to 0.70, or 0.55 to 0.68 dL/g as determined in 60/40 (wt/wt) phenol/tetrachloroethane at a concentration of 0.25 g/50 ml at 25° C.

In aspect 7 of this invention, an oriented film or shrink film is provided comprising a polyester composition which comprises:
(a) a dicarboxylic acid component comprising:
   (i) about 90 to about 100 mole % of terephthalic acid residues;
   (ii) about 0 to about 10 mole % of aromatic and/or aliphatic dicarboxylic acid residues having up to 20 carbon atoms; and
(b) a glycol component comprising:
   (i) about 5 to about 30 mole % 2,2,4,4-tetramethyl-1,3-cyclobutanediol residues, and
   (ii) about 70 to about 95 mole % ethylene glycol residues; or
   (i) about 10 to about 30 mole % 2,2,4,4-tetramethyl-1,3-cyclobutanediol residues, and
   (ii) about 70 to about 90 mole % ethylene glycol residues; or
   (i) about 15 to about 30 mole % 2,2,4,4-tetramethyl-1,3-cyclobutanediol residues, and
   (ii) about 70 to about 85 mole % ethylene glycol residues; or
   (i) about 15 to about 28 mole % 2,2,4,4-tetramethyl-1,3-cyclobutanediol residues; and
   (ii) about 72 to about 85 mole % ethylene glycol residues; or
   (i) about 15 to about 25 mole % 2,2,4,4-tetramethyl-1,3-cyclobutanediol residues; and
   (ii) about 75 to about 85 mole % ethylene glycol residues; and
optionally, diethylene glycol residues in the amount of at least 0.80 mole %, or from 0.80 to 10 mole %, or from 0.80 to 8 mole % whether formed during polymerization or intentionally added or both;
wherein the total mole % of the dicarboxylic acid component is 100 mole %, and
wherein the total mole % of the glycol component is 100 mole %;
wherein the inherent viscosity of the polyester is from 0.50 to 0.80 dL/g, or 0.50 to 0.70, or 0.55 to 68 dL/g as determined in 60/40 (wt/wt) phenol/tetrachloroethane at a concentration of 0.25 g/50 ml at 25° C. In certain embodiments, the polyester can optionally have a Tg of from 80° C. to 105° C., or from 80° C. to 100° C., 80° C. to less than 100° C., or from 80° C. to 99° C., or from 80° C. to 98° C.

In aspect 8 of this invention, an oriented film or shrink film is provided comprising a polyester composition which comprises:

(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 11 to about 29 mole % 2,2,4,4-tetramethyl-1,3-cyclobutanediol residues;
  (ii) about 71 to about 89 mole % ethylene glycol residues and
  (iii) optionally, diethylene glycol residues in the amount of at least 0.80 mole %, or from 0.80 to 10 mole %, or from 0.80 to 8 mole % whether formed during polymerization or intentionally added or both; or
  (i) about 14 to about 29 mole % 2,2,4,4-tetramethyl-1,3-cyclobutanediol residues;
  (ii) about 71 to about 86 mole % ethylene glycol residues; and
  (iii) optionally, diethylene glycol residues in the amount of at least 0.80 mole %, or from 0.80 to 10 mole %, or from 0.80 to 8 mole % whether formed during polymerization or intentionally added or both; and
wherein the total mole % of the dicarboxylic acid component is 100 mole %, and
wherein the total mole % of the glycol component is 100 mole %;
wherein the inherent viscosity of the polyester is from 0.50 to 0.80 dL/g, or 0.50 to 0.70, or 0.55 to 0.68 dL/g as determined in 60/40 (wt/wt) phenol/tetrachloroethane at a concentration of 0.25 g/50 ml at 25° C. In certain embodiments, the polyester can optionally have a Tg of from 80° C. to 105° C., or from 80° C. to 100° C., 80° C. to less than 100° C., or from 80° C. to 99° C., or from 80° C. to 98° C.

In aspect 9 of this invention, an oriented or a shrink film is provided comprising a polyester composition which comprises:
(1) at least one polyester comprising:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 34 to about 38 mole % 2,2,4,4-tetramethyl-1,3-cyclobutanediol residues;
    (ii) about 62 to about 66 mole % ethylene glycol residues; or
    (i) about 34.2 to about 38 mole % 2,2,4,4-tetramethyl-1,3-cyclobutanediol residues;
    (ii) about 62 to about 65.8 mole % ethylene glycol residues; and
    (iii) optionally, diethylene glycol residues in the amount of at least 0.80 mole %, or from 0.80 to 10 mole %, or from 0.80 to 8 mole %, whether formed during polymerization or intentionally added or both; and
wherein the total mole % of the dicarboxylic acid component is 100 mole %, and
wherein the total mole % of the glycol component is 100 mole %;
wherein the inherent viscosity of the polyester is 0.50 to 0.70 dL/g, or 0.55 to 0.65 dL/g as determined in 60/40 (wt/wt) phenol/tetrachloroethane at a concentration of 0.25 g/50 ml at 25° C.; and
(2) optionally, at least one plasticizer.

In aspect 10 of this invention, an oriented film or a shrink film is provided comprising a polyester composition which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 10 to about 42 mole % 2,2,4,4-tetramethyl-1,3-cyclobutanediol residues;
  (ii) about 58 to about 90 mole % ethylene glycol residues; and
  (iii) less than 20 mole % 1,4-cyclohexanedimethanol residues; or
  (i) about 14 to about 42 mole % 2,2,4,4-tetramethyl-1,3-cyclobutanediol residues; and
  (ii) about 58 to about 86 mole % ethylene glycol residues; and
  (iii) optionally, diethylene glycol residues, and
wherein the total mole % of the dicarboxylic acid component is 100 mole %, and
wherein the total mole % of the glycol component is 100 mole %;
wherein the inherent viscosity of the polyester is from 0.50 to 0.80 dL/g, or 0.50 to 0.70 dL/g, or 0.55 to 0.68 dL/g as determined in 60/40 (wt/wt) phenol/tetrachloroethane at a concentration of 0.25 g/50 ml at 25° C.; and
wherein the L* color value for the polyester is 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve.

In aspect 11 of this invention, an oriented film or a shrink film is provided comprising a polyester composition which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 5 to about 30 mole % of 2,2,4,4-tetramethyl-1,3-cyclobutanediol residues; and
  (ii) about 70 to about 95 mole % ethylene glycol residues; and
  (iii) optionally, diethylene glycol residues; or
  (i) about 10 to about 30 mole % of 2,2,4,4-tetramethyl-1,3-cyclobutanediol residues; and
  (ii) about 70 to about 90 mole % ethylene glycol residues; and
  (iii) optionally, diethylene glycol residues; or
  (i) about 15 to about 30 mole % of 2,2,4,4-tetramethyl-1,3-cyclobutanediol residues; and (ii) about 70 to about 85 mole % ethylene glycol residues, and (iii) optionally, diethylene glycol residues; or (i) about 15 to about 28 mole % 2,2,4,4-tetramethyl-1,3-cyclobutanediol residues; and (ii) about 72 to about 85 mole % ethylene glycol residues, and (iii) optionally, diethylene glycol residues; or (i) about 15 to about 25 mole % 2,2,4,4-tetramethyl-1,3-cyclobutanediol residues; and (ii) about 72 to about 85 mole % ethylene glycol residues; and (iii) optionally, diethylene glycol residues;

wherein the total mole % of the dicarboxylic acid component is 100 mole %, and wherein the total mole % of the glycol component is 100 mole %;

wherein the inherent viscosity of the polyester is from 0.50 to 0.8 dL/g, or 0.50 to 0.70 dL/g, or 0.55 to 0.68 dL/g as determined in 60/40 (wt/wt) phenol/tetrachloroethane at a concentration of 0.25 g/50 ml at 25° C.; and wherein the L* color value for the polyester is 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve. In certain embodiments, the polyester can optionally have a Tg of from 80° C. to 105° C., or from 80° C. to 100° C., 80° C. to less than 100° C., or from 80° C. to 99° C., or from 80° C. to 98° C.

In aspect 12 of this invention, an oriented film or a shrink film is provided comprising a polyester composition which comprises:

(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and (b) a glycol component comprising:
(i) about 11 to about 29 mole %, or about 10 to about 27 mole % of 2,2,4,4-tetramethyl-1,3-cyclobutanediol residues;
(ii) about 71 to about 89 mole % ethylene glycol residues; or
(i) about 14 to about 29 mole %, or about 10 to about 27 mole % of 2,2,4,4-tetramethyl-1,3-cyclobutanediol residues;
(ii) about 71 to about 86 mole % ethylene glycol residues; and optionally, diethylene glycol residues, and wherein the total mole % of the dicarboxylic acid component is 100 mole %, and wherein the total mole % of the glycol component is 100 mole %;

wherein the inherent viscosity of the polyester is from 0.50 to 0.8 dL/g, or 0.50 to 0.70 dL/g, or 0.55 to 0.68 dL/g as determined in 60/40 (wt/wt) phenol/tetrachloroethane at a concentration of 0.25 g/50 ml at 25° C.; and wherein the L* color value for the polyester is 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve. In certain embodiments, the polyester can optionally have a Tg of from 80° C. to 105° C., or from 80° C. to 100° C., 80° C. to less than 100° C., or from 80° C. to 99° C., or from 80° C. to 98° C.

In aspect 13 of this invention, an oriented film or a shrink film is provided comprising a polyester composition which comprises:

(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and (b) a glycol component comprising:
(i) about 34 to about 38 mole % 2,2,4,4-tetramethyl-1,3-cyclobutanediol residues;
(ii) about 62 to about 66 mole % ethylene glycol residues; or
(i) about 34.2 to about 38 mole % 2,2,4,4-tetramethyl-1,3-cyclobutanediol residues;
(ii) about 62 to about 65.8 mole % ethylene glycol residues;
(iii) optionally, diethylene glycol residues, and wherein the total mole % of the dicarboxylic acid component is 100 mole %, and wherein the total mole % of the glycol component is 100 mole %;

wherein the inherent viscosity of the polyester is from 0.50 to 0.8 dL/g, or 0.50 to 0.70 dL/g, or 0.55 to 0.68 dL/g as determined in 60/40 (wt/wt) phenol/tetrachloroethane at a concentration of 0.25 g/50 ml at 25° C.; and wherein the L* color value for the polyester is 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve. In certain embodiments, the polyester can optionally have a Tg of from 100° C. to 115° C., or from 100° C. to 110° C.

In aspect 14 of this invention, an oriented film or a shrink film is provided comprising a polyester composition which comprises:

(1) at least one polyester comprising:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and (b) a glycol component comprising:
(i) about 10 to about 42 mole % 2,2,4,4-tetramethyl-1,3-cyclobutanediol residues;

(ii) about 58 to about 90 mole % ethylene glycol residues, and
(iii) less than 20 mole % 1,4-cyclohexanedimethanol residues; or
(i) about 14 to about 42 mole % 2,2,4,4-tetramethyl-1,3-cyclobutanediol residues; and
(ii) about 58 to about 86 mole % ethylene glycol residues; and
(iii) optionally, diethylene glycol residues; and
wherein the total mole % of the dicarboxylic acid component is 100 mole %, and
wherein the total mole % of the glycol component is 100 mole %;
wherein the inherent viscosity of the polyester is from 0.50 to 0.80 dL/g, or 0.50 to 0.70, or 0.55 to 0.68 dL/g as determined in 60/40 (wt/wt) phenol/tetrachloroethane at a concentration of 0.25 g/50 ml at 25° C.;
wherein the polyester has a Tg of from 80° C. to less than 100° C., or from 80° C. to 98° C., as determined using a TA DSC 2920 from Thermal Analyst Instrument at a scan rate of 20° C./min.; and
(c) a catalyst/stabilizer component which comprises:
  (i) titanium atoms in the range of 10-50 ppm based on total polymer weight,
  (ii) optionally, manganese atoms in the range of 10-100 ppm based on total polymer weight, and
  (iii) phosphorus atoms in the range of 10-200 ppm based on total polymer weight; and
(2) optionally, wherein the polyester composition comprises at least one plasticizer.

In aspect 15 of this invention, an oriented film or a shrink film is provided comprising a polyester composition which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 5 to about 30 mole % 2,2,4,4-tetramethyl-1,3-cyclobutanediol residues; and
  (ii) about 70 to about 95 mole % ethylene glycol residues;
  (iii) optionally, less than 20 mole % 1,4-cyclohexanedimethanol residues, and
  (iv) optionally, diethylene glycol residues; or
  (i) about 10 to about 30 mole % 2,2,4,4-tetramethyl-1,3-cyclobutanediol residues; and
  (ii) about 70 to about 90 mole % ethylene glycol residues;
  (iii) optionally, less than 20 mole % 1,4-cyclohexanedimethanol residues, and
  (iv) optionally, diethylene glycol residues; or
  (i) about 15 to about 30 mole % 2,2,4,4-tetramethyl-1,3-cyclobutanediol residues;
  (ii) about 70 to about 85 mole % ethylene glycol residues;
  (iii) optionally, diethylene glycol residues; or
  (i) about 15 to about 28 mole % 2,2,4,4-tetramethyl-1,3-cyclobutanediol residues; and
  (ii) about 72 to about 85 mole % ethylene glycol residues,
  (iii) optionally, diethylene glycol residues; or
  (i) about 15 to about 25 mole % 2,2,4,4-tetramethyl-1,3-cyclobutanediol residues; and
  (ii) about 75 to about 85 mole % ethylene glycol residues; and
  (iii) optionally, diethylene glycol residues;
wherein the total mole % of the dicarboxylic acid component is 100 mole %, and
wherein the total mole % of the glycol component is 100 mole %;
wherein the inherent viscosity of the polyester is from 0.50 to 0.8 dL/g, or 0.50 to 0.70 dL/g, or 0.55 to 0.68 dL/g as determined in 60/40 (wt/wt) phenol/tetrachloroethane at a concentration of 0.25 g/50 ml at 25° C.; and
(c) a catalyst/stabilizer component which comprises:
  (i) titanium atoms in the range of 10-50 ppm based on total polymer weight,
  (ii) optionally, manganese atoms in the range of 10-100 ppm based on total polymer weight, and
  (iii) phosphorus atoms in the range of 10-200 ppm based on total polymer weight.

In certain embodiments, the polyester can optionally have a Tg of from 80° C. to 105° C., or from 80° C. to 100° C., 80° C. to less than 100° C., or from 80° C. to 99° C., or from 80° C. to 98° C.

In aspect 16 of this invention, an oriented film or a shrink film is provided comprising a polyester composition which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 11 to about 29 mole of 2,2,4,4-tetramethyl-1,3-cyclobutanediol residues;
  (ii) about 71 to about 89 mole % ethylene glycol residues;
  (iii) optionally, diethylene glycol residues, or
  (i) about 14 to about 29 mole of 2,2,4,4-tetramethyl-1,3-cyclobutanediol residues;
  (ii) about 71 to about 86 mole % ethylene glycol residues;
  (iii) optionally, diethylene glycol residues, and
wherein the total mole % of the dicarboxylic acid component is 100 mole %, and
wherein the total mole % of the glycol component is 100 mole %;
wherein the inherent viscosity of the polyester is from 0.50 to 0.8 dL/g, or 0.50 to 0.75 dL/g, or 0.50 to 0.70 dL/g, or 0.55 to 0.70 dL/g, or 0.55 to 0.68 dL/g as determined in 60/40 (wt/wt) phenol/tetrachloroethane at a concentration of 0.25 g/50 ml at 25° C.; and
(c) a catalyst/stabilizer component which comprises:
  (i) titanium atoms in the range of 10-50 ppm based on total polymer weight,
  (ii) optionally, manganese atoms in the range of 10-100 ppm based on total polymer weight, and
  (ii) phosphorus atoms in the range of 10-200 ppm based on total polymer weight.

In certain embodiments, the polyester can optionally have a Tg of from 80° C. to 105° C., or from 80° C. to 100° C., or 80° C. to less than 100° C., or 85° C. to 100° C., or 85° C. to less than 100° C., or from 85° C. to 99° C., or from 85° C. to 98° C.

In aspect 17 of this invention, an oriented film or a shrink film is provided comprising a polyester composition which comprises:

(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 34 to about 38 mole % 2,2,4,4-tetramethyl-1,3-cyclobutanediol residues; and
  (ii) about 62 to about 66 mole % ethylene glycol residues; or
  (i) about 34.2 to about 38 mole % 2,2,4,4-tetramethyl-1,3-cyclobutanediol residues
  (ii) about 62 to about 65.8 mole % ethylene glycol residues; and
  (iii) optionally, diethylene glycol residues, and
wherein the total mole % of the dicarboxylic acid component is 100 mole %, and
wherein the total mole % of the glycol component is 100 mole %;
wherein the inherent viscosity of the polyester is from 0.50 to 0.8 dL/g, or 0.50 to 0.70 dL/g, or 0.55 to 0.68 dL/g as determined in 60/40 (wt/wt) phenol/tetrachloroethane at a concentration of 0.25 g/50 ml at 25° C.; and
(c) a catalyst/stabilizer component which comprises:
  (i) titanium atoms in the range of 10-50 ppm based on total polymer weight,
  (ii) manganese atoms in the range of 10-100 ppm based on total polymer weight, and
  (iii) phosphorus atoms in the range of 10-200 ppm based on total polymer weight.
In certain embodiments, the polyester can optionally have a Tg of from 100° C. to 115° C., or from 100° C. to 110° C.

Aspect 18 of the invention can include but is not limited to aspects 1-17 and can be applicable to certain embodiments of the invention where the L* color values for the polyester useful in the invention can be greater than 90, as determined by the L*a*b* color system measured following ASTM D 6290-98 and ASTM E308-99, performed on polymer granules ground to pass a 1 mm sieve.

Aspect 19 of the invention can include but is not limited to aspects 1-18 and can be applicable to certain embodiments of the invention where the L* value for the oriented films or shrink films of the invention can be 90 or greater, as determined by the L*a*b* color system measured following ASTM D 6290-98 and ASTM E308-99, using measurements from a Hunter Lab Ultrascan XE Spectrophotometer with the following parameters: (1) 065 illuminant, (2) 10 degree observer, (3) transmittance mode with specular angle included, (4) large area view, (5) 1" port size, and where the measurements were performed on film.

Aspect 20 of the invention can include but is not limited to aspects 1-19 and can be applicable to certain embodiments of the invention where the polyester useful in the invention can comprise a catalyst/stabilizer component which comprises: (i) titanium atoms in the range of 10-50 ppm based on total polymer weight, (ii) optionally, manganese atoms in the range of 10-100 ppm based on total polymer weight, and (iii) phosphorus atoms in the range of 10-200 ppm based on total polymer weight. In yet another embodiment, tin catalyst is excluded from aspects 1-19.

Aspect 21 of the invention can include but is not limited to certain aspects such as aspects 1-20 where the polyester useful in the invention can have a Tg of from 80° C. to 105° C., or from 80° C. to 100° C., or from 80° C. to less than 100° C., or from 80° C. to 99° C., or from 80° C. to 98° C., or from 80° C. to 97° C., or from 80° C. to 96° C., or from 100° C. to 115° C. as determined using a TA DSC 2920 from Thermal Analyst Instrument at a scan rate of 20° C./min. Any other embodiment described herein can also have these Tg ranges if the polyester composition can attain this Tg range, with or without the use of additives such as plasticizers.

Aspect 22 of the invention can include but is not limited to aspects 1-21 where the polyester useful in the invention can have a melt viscosity of the polyester(s) useful in the invention can be less than 30,000 poise as measured a 1 radian/second on a rotary melt rheometer at 290° C. In certain aspects, the melt viscosity of the polyester(s) useful in the invention can be less than 20,000 poise as measured a 1 radian/second on a rotary melt rheometer at 290° C. In certain aspects, the melt viscosity of the polyester(s) useful in the invention can be less than 15,000 poise as measured at 1 radian/second (rad/sec) on a rotary melt rheometer at 290° C. In certain aspects, the melt viscosity of the polyester(s) useful in the invention can be less than 12,000 poise as measured at 1 radian/second (rad/sec) on a rotary melt rheometer at 290° C. In certain aspects, the melt viscosity of the polyester(s) useful in the invention can be less than 10,000 poise as measured at 1 radian/second (rad/sec) on a rotary melt rheometer at 290° C.

Aspect 23 of the invention can include but is not limited to aspects 1-22 where the polyester useful in the invention can have one or more of following properties chosen from: a Tg of from about 85 to about 100° C. as measured by a TA 2100 Thermal Analyst Instrument at a scan rate of 20° C./min, a flexural modulus at 23° C. of greater than about 2000 MPa (290,000 psi) as defined by ASTM D790, and a notched Izod impact strength greater than about 25 J/m (0.47 ft-lb/in) according to ASTM D256 with a 10-mil notch using a ⅛-inch thick bar at 23° C.

Aspect 24 of the invention can include but is not limited to aspect 1-23 and can be applicable to other embodiments of the invention as well where the shrink film of the invention can have transverse direction shrinkage of from 20% to 70% and from 2% shrinkage in the machine direction to 15% growth in the machine direction when immersed in water at 95° C. for 10 seconds.

Aspect 25 of the invention can include but is not limited to aspects 1-24 and can be applicable to other embodiments of the invention as well where the shrink film of the invention can have transverse direction shrinkage of from 20% to 65% and from 2% shrinkage in the machine direction to 15% growth in the machine direction when immersed in water at 95° C. for 10 seconds.

Aspect 26 of the invention can include but is not limited to aspects 1-25 and can be applicable to other embodiments of the invention as well where the shrink film of the invention can have transverse direction shrinkage of from 20% to 55% and from 3% to 15% growth in the machine direction when immersed in water at 95° C. for 10 seconds.

Aspect 27 of the invention can include but is not limited to aspects 1-26 and can be applicable to other embodiments of the invention as well where the shrink film of the invention can have shrinkage in the transverse direction in the amount of 35% to 85% and 4% shrinkage in the machine direction to 15% growth in the machine direction over a range of 95° C. to 125° C. in a hot air oven.

Aspect 28 of the invention can include but is not limited to aspects 1-27 and can be applicable to other embodiments of the invention as well where the shrink film of the invention can have shrinkage in the transverse direction in the amount of 40% to 80% and growth in the machine direction of 0 to 15% over a range of 95° C. to 125° C. in a hot air oven.

In Aspect 29 of the invention which can include but is not limited to aspects 1-28 and can be applicable to other embodiments of the invention as well where the shrink film of the invention can have shrinkage in the transverse direction in the amount of 40% to 75% and growth in the machine direction of 0 to 15% over a range of 95° C. to 125° C. in a hot air oven.

In Aspect 30 of the invention, which can include but is not limited to aspects 1-29, the polyesters useful in the invention are made into film using any method known in the art to produce films from polyesters, for example, solution casting, extrusion, compression molding, or calendering. The pre-shrunk film is then oriented in one or more directions (e.g., monoaxially and/or biaxially oriented film). This orientation of the film can be performed by any method known in the art using standard orientation conditions. For example, the oriented films of the invention can be made from films having a thickness of about 100 to 400 microns, for example, extruded, cast or calendered films, which can be oriented at a ratio of 5:1 to 3:1 at a temperature of from 100° C. to 125° C. or from 104° C. to 114° C., for example, at a ratio of 5:1 or of 3:1 at a temperature from 104° C. to 114° C., and which can be oriented to a thickness of 20 to 80 microns. In one embodiment, the orientation of the initial pre-shrunk film can be performed on a tenter frame according to these orientation conditions.

Aspect 31 of the invention can include but is not limited to aspects 1-30 and can be applicable to other embodiments of the invention as well where the shrink films of the invention have no more than 30% shrinkage in the transverse direction per 5% temperature increase increment.

Aspect 32 of the invention can include but is not limited to aspects 1-31 and can be applicable to other embodiments of the invention as well where the shrink films of the invention have a Young's modulus of from 1500 to 5000 MPa at stretching speeds of from 300 mm/minute to 500 mm/minute in the transverse direction according to ASTM Method D882.

Aspect 33 of the invention can include but is not limited to aspects 1-32 and can be applicable to other embodiments of the invention as well where the shrink film of the invention can have a Young's modulus of from 1500 to 2300 MPa at stretching speeds of from 300 mm/minute to 500 mm/minute in the machine direction according to ASTM Method D882.

Aspect 34 of the invention can include but is not limited to aspects 1-33 and can be applicable to other embodiments of the invention as well where the shrink film of the invention can have a shrink initiation temperature of from about 70 to about 90° C., or about 70 to about 85° C., or 75 to about 90° C., or about 75 to about 85° C., or about 70 to about 80° C., or of 80° C. Shrink initiation temperature is the temperature at which onset of shrinking occurs.

Aspect 35 of the invention can include but is not limited to aspects 34 and can be applicable to other embodiments of the invention as well where the shrink film of the invention can have a shrink initiation temperature of between 75° C. and 85° C. In certain embodiment, the shrink film also does not shrink additionally when exposed to temperatures above 75° C. and 85° C.

Aspect 36 of the invention can include but is not limited to aspects 1-35 and can be applicable to other embodiments of the invention as well where the shrink film of the invention can have a break strain percentage of 15 to 170% at stretching speeds of from 300 mm/minute to 500 mm/minute in the transverse direction and/or the machine direction according to ASTM Method D882.

Aspect 37 of the invention can include but is not limited to aspects 1-36 and can be applicable to other embodiments of the invention as well where the shrink film of the invention can have a tensile stress at break (break stress) of from 30 to 270 MPa; or 40 to 260 MPa; or 42 to 260 MPa as measured according to ASTM Method 0882.

Aspect 38 of the invention can include but is not limited to aspects 1-37 and can be applicable to other embodiments of the invention as well where the shrink film of the invention can have a shrink force of from 6 to 15, or from 8 to 15, or from 10 to 15 MPa, as measured by ISO Method 14616.

In one embodiment of this invention, the shrinkage properties of the oriented film were not adjusted by annealing the film at a temperature higher than the temperature in which it was oriented.

In certain aspects of the invention, the glycol component of the polyester useful in the invention comprises: (i) about 10 to about 40 mole % 2,2,4,4-tetramethyl-1,3-cyclobutanediol (TMCD) residues and about 60 to about 90 mole % ethylene glycol residues; (ii) about 10 to about 30 mole % 2,2,4,4-tetramethyl-1,3-cyclobutanediol (TMCD) residues and about 70 to about 90 mole % ethylene glycol residues; (iii) about 11 to about 29 mole % 2,2,4,4-tetramethyl-1,3-cyclobutanediol (TMCD) residues and about 71 to about 89 mole % ethylene glycol residues; (iv) about 15 to about 25 mole % 2,2,4,4-tetramethyl-1,3-cyclobutanediol (TMCD) residues and about 85 to about 75 mole % ethylene glycol residues; (v) about 15 to about 28 mole 2,2,4,4-tetramethyl-1,3-cyclobutanediol (TMCD) residues and about 85 to about 72 mole % ethylene glycol residues; (vi) about 20 to about 25 mole c/2,2,4,4-tetramethyl-1,3-cyclobutanediol (TMCD) residue; and about 80 to about 75 mole % ethylene glycol residues; or (vii) about 21 to about 24 mole % 2,2,4,4-tetramethyl-1,3-cyclobutanediol (TMCD) residues and about 76 to about 79 mole % ethylene glycol residues.

In certain aspects of the invention, the glycol component of the polyester useful in the invention comprises 2,2,4,4-tetramethyl-1,3-cyclobutanediol (TMCD) residues in one of the following amounts: (i) about 10 to about 40 mole; (ii) about 10 to about 30 mole %; (iii) about 11 to about 29 mole %; (iv) about 11 to about 28 mole %; (v) about 11 to about 27 mole %; (vi) about 11 to about 26 mole %; (vii) about 15 to about 25 mole %; (viii) about 15 to about 28 mole %; (ix) about 20 to about 25 mole %; or (x) about 21 to about 24 mole %; wherein the remaining balance of the glycol component is either (a) ethylene glycol or (b) ethylene glycol and up to 30 mole %, or up to 20 mole %, or less than 20 mole %, or up to 10 mole %, or up to 8 mole %, or up to 5 mole %, or up to 2 mole % of modifying glycols.

In certain aspects of the invention, the polyester useful in the invention relates to a catalyst/stabilizer/copolyester composition resulting in copolyesters containing ethylene glycol (EG), 2,2,4,4-tetramethyl-1,3-cyclobutanediol (TMCD), and, optionally, a small amount of 1,4-cyclohexanedimethanol (CHDM), e.g., less than 20 mole %, or less than 15 mole %, or less than 10 mole, or less than 5 mole %, or less than 3 mole %, or less than 2 mole %, or less than 1 mole % CHDM, with good TMCD incorporation, reduced yellowness, and inherent viscosities in the range from 0.5 dL/g to 0.8 &lg. In certain embodiments, the catalyst/stabilizer system useful herein can be used for compositions with glycol component comprising: (i) about 10 to about 27 mole % TMCD residues; and about 90 to about 73 mole % EG residues and (ii) about 10 to about 30 mole % TMCD residues; and about 90 to about 70 mole % EG residues. In certain embodiments, there is no intentionally added CHDM. In certain embodiments, there is no intentionally added diethylene glycol.

In certain aspects of the invention, the polyester contains less than about 2 mole % of a modifying glycol (other than diethylene glycol) having from 3 to 16 carbon atoms. In embodiments, the polyester contains less than about 2 mole % of any modifying glycols. In certain embodiments, the polyester contains no other added modifying glycols. It should be understood that some other glycol residues may be formed in situ during processing. The total amount of diethylene glycol residues can be present in the polyester useful in the invention, whether or not formed in situ during processing or intentionally added, or both, in any amount, for example, less than 10 mole %, less than 8 mole %, 0.01 to 10 mole %, or 0.01 to 8 mole %, or 0.01 to 7 mole %, or 0.01 to 6 mole %, or 0.1 to 5 mole %, 0.01 to 4 mole %, 0.01 to 3 mole %, or 0.01 to 2 mole %, 0.01 to 1 mole %, or 1 to 8 mole %, or 0.85 to 10 mole %, or 0.85 to 8 mole %, or 0.85 to 7 mole %, or 0.85 to 6 mole %, or 0.85 to 5 mole %, 0.85 to 4 mole %, 0.85 to 3 mole %, or 0.85 to 2 mole %, or 1 to 10 mole %, or 1 to 8 mole %, or 1 to 7 mole %, or 1 to 6 mole %, or 1 to 5 mole %, 1 to 4 mole %, 1 to 3 mole %, or 1 to 2 mole %.

In certain aspects of the invention, the b* values for the polyesters useful in the invention [in one embodiment, in the presence of toner(s), and, in one embodiment in the absence of toner(s)] can be from −12 to less than 10 or from −12 to less than 5 as determined by the L*a*b* color system of the CIE (International Commission on Illumination) (translated), wherein L* represents the lightness coordinate, a* represents the red/green coordinate, and b* represents the yellow/blue coordinate. In one embodiment, the b* values for the polyesters useful in the invention [in one embodiment, in the presence of and/or in the absence of toner(s)] can be from 0 to 10. In one embodiment, the b* values for the polyesters useful in the invention [in one embodiment, in the presence of and/or in the absence of toner(s)] can be from 0 to 5.

In certain aspects, the polyester composition useful in the invention can further comprise a catalyst/stabilizer component comprising: (i) titanium atoms in the range of 10-50 ppm based on polymer weight, (ii) optionally, manganese atoms in the range of 10-100 ppm based on polymer weight, and (iii) phosphorus atoms in the range of 10-200 ppm based on polymer weight. In certain embodiments, the catalyst/stabilizer component comprises: (i) titanium atoms in the range of 10-50 ppm based on polymer weight, (ii) manganese atoms in the range of 10-100 ppm based on polymer weight, and (iii) phosphorus atoms in the range of 10-200 ppm based on polymer weight. In certain embodiments, the catalyst/stabilizer component comprises no intentionally added tin, where tin may only be present as an impurity. In certain embodiments, the catalyst/stabilizer component comprises no tin, or, if present, less than 5 ppm tin, or less than 2 ppm tin, or less than 1 ppm tin. The catalyst/stabilizer component can result in a good combination of TMCD incorporation, reactivity to achieve a desired target IV, increased brightness and reduced yellowness.

In certain aspects of the invention, the polyester composition comprises at least one catalyst comprising at least one titanium compound and, optionally, at least one manganese compound. In certain embodiments, the catalyst comprises no tin, or, if present, less than 5 ppm tin, or less than 2 ppm tin, or less than 1 ppm tin based on the total weight of the resulting polymer. In one embodiment, the catalyst comprises no tin.

In certain aspects of the invention, the 2,2,4,4-tetramethyl-1,3-cyclobutanediol residues is a mixture comprising more than 50 mole % of cis-2,2,4,4-tetramethyl-1,3-cyclobutanediol residues and less than 50 mole % of trans-2,2,4,4-tetramethyl-1,3-cyclobutanediol residues.

In certain aspects of the invention, the addition of the phosphorus compound(s) in the process(es) of the invention can result in a weight ratio of total phosphorus atoms to total titanium atoms in the final polyester of 0.3-2.5:1. In one embodiment, the addition of the phosphorus compound(s) in the process(es) of the invention can result in a weight ratio of total phosphorus atoms to total titanium atoms in the final polyester of 0.3-2.0:1.

For example, the weight of titanium atoms and phosphorus atoms present in the final polyester can be measured in ppm and can result in a weight ratio of total phosphorus atoms to total titanium atoms in the final polyester of any of the aforesaid weight ratios.

In certain aspects of the invention, the addition of the phosphorus compound(s) in the process(es) of the invention can result in a weight ratio of total phosphorus atoms to total manganese atoms in the final polyester of 0.3-2.5:1. In one embodiment, the addition of the phosphorus compound(s) in the process(es) of the invention can result in a weight ratio of total phosphorus atoms to total manganese atoms in the final polyester of 0.3-2.0:1.

For example, the weight of titanium atoms and phosphorus atoms present in the final polyester can be measured in ppm and can result in a weight ratio of total phosphorus atoms to total manganese atoms in the final polyester of any of the aforesaid weight ratios.

In one aspect, the amount of titanium atoms in the polyesters useful in the invention can be from 10 to 50 ppm titanium atoms based on the weight of the final polyester.

In one aspect, the amount of titanium atoms in the polyesters useful in the invention can be from 15 to 50 ppm titanium atoms based on the weight of the final polyester.

In one aspect, the amount of manganese atoms in the polyesters useful in the invention can be from 10 to 100 ppm manganese atoms based on the weight of the final polyester.

In one aspect, the amount of manganese atoms in the polyesters useful in the invention can be from 10 to 60 ppm manganese atoms based on the weight of the final polyester.

In one aspect, the amount of phosphorus atoms in the polyesters useful in the invention can be from 1 to 200 ppm phosphorus atoms based on the weight of the final polyester.

In one aspect, the amount of phosphorus atoms in the polyesters useful in the invention can be from 15 to 60 ppm, or 15 to 55 ppm, phosphorus atoms based on the weight of the final polyester and the amount of titanium atoms in the polyester can be from 15 to 50 ppm titanium atoms based on the weight of the final polyester.

In one aspect, the amount of phosphorus atoms in the polyesters useful in the invention can be from 15 to 55 ppm phosphorus atoms based on the weight of the final polyester, the amount of titanium atoms in the polyester can be from 15 to 50 ppm titanium atoms based on the weight of the final polyester, and the amount of manganese atoms in the polyester can be from 10 to 60 ppm titanium atoms based on the weight of the final polyester.

It is believed that the oriented films and/or shrink films of the invention meet one or more of the objectives stated herein.

BRIEF DESCRIPTION OF THE FIGURES

Certain embodiments of the present disclosure are described herein with reference to the following figures, wherein:

FIG. 1 is a graph depicting the shrinkage properties for a shrink film made from a film comprising Polymer F as described in the Examples herein; the composition of Polymer F comprises about 23.26 mole % 2,2,4,4-tetramethyl-1,3-cyclobutanediol residues, about 75.89 mole % ethylene glycol residues and about 0.85 mole % diethylene glycol residues having an inherent viscosity of about 0.63 dL/g as measured by the method described herein.

FIG. 2 is a graph depicting the shrinkage properties for a shrink film made from a film comprising Polymer J as described in the Examples; the composition of Polymer J comprises about 22.37 mole % 2,2,4,4-tetramethyl-1,3-cyclobutanediol residues, about 75.42 mole % ethylene glycol residues and about 2.21 mole % diethylene glycol residues having an inherent viscosity of about 0.63 dL/g as measured by the method described herein.

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It is believed that certain oriented films comprising polyesters and/or polyester composition(s) useful in the invention formed from terephthalic acid, an ester thereof, and/or mixtures thereof, ethylene glycol and 2,2,4,4-tetramethyl-1, 3-cyclobutanediol, and, optionally comprising certain catalysts and stabilizers, reaction products thereof, and mixtures thereof, can have a unique combination of two or more of the following properties: certain notched Izod impact strength, certain inherent viscosities, melt viscosities, certain glass transition temperature (Tg), certain flexural modulus, good clarity, and good color.

It is believed that certain oriented films comprising polyesters and/or polyester composition(s) useful in the invention can produce an oriented film, for example, oriented film useful in making shrink film where the shrink film has at least one or more of the following properties: higher shrink activation temperatures, good stretching properties, good shrink force, good break stress and strain, good Young's modulus, good shrinkage properties in the transverse direction, good growth in the machine direction, and/or good ultimate shrinkage (shrinkage at the highest temperature, e.g. at 125° C. A combination of two or more of the above properties are also desirable.

It is believed that certain oriented films comprising polyesters and/or polyester composition(s) useful in the invention can have certain properties including those above and/or at least one of the following desirable shrink film properties: (1) a relatively higher shrinkage activation temperature, (2) a shrinkage percentage which increases gradually and in a controlled manner with increasing temperature, (3) a higher shrink force but low enough to prevent crushing of the underlying container, (4) a high ultimate shrinkage (for example, 60% or greater in the transverse direction), and (5) film toughness so as to prevent unnecessary fracturing, breaking, tearing, splitting, bubbling, or wrinkling of the film prior to and after shrinkage.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically, the difunctional carboxylic acid can be a dicarboxylic acid and the difunctional hydroxyl compound can be a dihydric alcohol such as, for example, glycols and dials. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a did to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a dial to make polyester.

The polyesters used in the present invention typically can be prepared from dicarboxylic acids and dials which react in substantially equal proportions and are incorporated into the polyester polymer as their corresponding residues. The polyesters of the present invention, therefore, can contain substantially equal molar proportions of acid residues (100 mole %) and dial (and/or multifunctional hydroxyl compound) residues (100 mole %) such that the total moles of repeating units is equal to 100 mole %. The mole percentages provided in the present disclosure, therefore, may be based on the total moles of acid residues, the total moles of did residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 25 mole % 2,2,4,4-tetramethyl-1,3-cyclobutanediol, based on the total dial residues, means the polyester contains 25 mole % 2,2,4,4-tetramethyl-1,3-cyclobutanediol residues out of a total of 100 mole % diol residues. Thus, there are 25 moles of 2,2,4,4-tetramethyl-1,3-cyclobutanediol residues among every 100 moles of diol residues.

In certain embodiments, terephthalic acid or an ester thereof, such as, for example, dimethyl terephthalate or a mixture of terephthalic acid residues and an ester thereof can make up a portion or all of the dicarboxylic acid component used to form the polyesters useful in the invention. In certain embodiments, terephthalic acid residues can make up a portion or all of the dicarboxylic acid component used to form the polyesters useful in the invention. In certain embodiments, higher amounts of terephthalic acid can be used in order to produce a higher impact strength polyester. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In embodiments, ranges of from 70 to 100 mole %; or 80 to 100 mole %; or 90 to 100 mole %; or 99 to 100 mole %; or 100 mole terephthalic acid and/or dimethyl terephthalate and/or mixtures thereof may be used.

In addition to terephthalic acid, the dicarboxylic acid component of the polyesters useful in the invention can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 10 mole %, from 0.01 to 5 mole % and from 0.01 to 1 mole %. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, cyclohexanedicarboxylic, malonic, succinic, glutaric, adipic, pimelic, suberic, azelaic and/or dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the polyesters useful in the invention.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

For the desired polyester, the molar ratio of cis/trans 2,2,4,4-tetramethyl-1,3-cyclobutanediol can vary from the pure form of each and mixtures thereof. In certain embodiments, the molar percentages for cis and/or trans 2,2,4,4,-tetramethyl-1,3-cyclobutanediol are greater than 50 mole % cis and less than 50 mole % trans; or greater than 55 mole % cis and less than 45 mole % trans; or 50 to 70 mole % cis and 50 to 30 mole % trans; or 60 to 70 mole % cis and 30 to 40 mole % trans; or greater than 70 mole % cis and less than 30 mole % trans; wherein the total mole percentages for cis- and trans-2,2,4,4-tetramethyl-1,3-cyclobutanediol is equal to 100 mole %. In an additional embodiment, the molar ratio of cis/trans 2,2,4,4-tetramethyl-1,3-cyclobutanediol can vary within the range of 50/50 to 0/100, for example, between 40/60 to 20/80.

The polyesters useful in the invention can include but is not limited to residues of 2,2,4,4-tetramethyl-1,3-cyclobutanediol and ethylene glycol being present in one of the following amounts: about 17 to about 30 mole % 2,2,4,4-tetramethyl-1,3-cyclobutanediol and about 70 to about 83 mole % ethylene glycol; about 17 to about 29 mole % 2,2,4,4-tetramethyl-1,3-cyclobutanediol and about 71 to about 83 mole % ethylene glycol; about 17 to about 28 mole % 2,2,4,4-tetramethyl-1,3-cyclobutanediol and about 72 to about 83 mole % ethylene glycol; about 17 to about 27 mole % 2,2,4,4-tetramethyl-1,3-cyclobutanediol and about 73 to about 83 mole % ethylene glycol; about 17 to about 26 mole % 2,2,4,4-tetramethyl-1,3-cyclobutanediol and about 74 to about 83 mole % ethylene glycol; about 17 to about 25 mole % 2,2,4,4-tetramethyl-1,3-cyclobutanediol and about 75 to about 83 mole % ethylene glycol; about 17 to about 24 mole % 2,2,4,4-tetramethyl-1,3-cyclobutanediol and about 76 to about 83 mole % ethylene glycol; or about 17 to about 23 mole % 2,2,4,4-tetramethyl-1,3-cyclobutanediol and about 77 to about 83 mole % ethylene glycol; or about 16 to about 30 mole % 2,2,4,4-tetramethyl-1,3-cyclobutanediol and about 70 to about 84 mole % ethylene glycol; about 16 to about 29 mole % 2,2,4,4-tetramethyl-1,3-cyclobutanediol and about 71 to about 84 mole % ethylene glycol; about 16 to about 28 mole % 2,2,4,4-tetramethyl-1,3-cyclobutanediol and about 72 to about 84 mole % ethylene glycol; about 16 to about 27 mole % 2,2,4,4-tetramethyl-1,3-cyclobutanediol and about 73 to about 84 mole % ethylene glycol; about 16 to about 26 mole % 2,2,4,4-tetramethyl-1,3-cyclobutanediol and about 74 to about 84 mole % ethylene glycol; about 16 to about 25 mole % 2,2,4,4-tetramethyl-1,3-cyclobutanediol and about 75 to about 84 mole % ethylene glycol; about 16 to about 24 mole % 2,2,4,4-tetramethyl-1,3-cyclobutanediol and about 76 to about 84 mole % ethylene glycol; or about 15 to about 23 mole % 2,2,4,4-tetramethyl-1,3-cyclobutanediol and about 77 to about 85 mole % ethylene glycol; or about 15 to about 30 mole % 2,2,4,4-tetramethyl-1,3-cyclobutanediol and about 70 to about 85 mole % ethylene glycol; about 15 to about 29 mole % 2,2,4,4-tetramethyl-1,3-cyclobutanediol and about 71 to about 85 mole % ethylene glycol; about 15 to about 28 mole % 2,2,4,4-tetramethyl-1,3-cyclobutanediol and about 72 to about 85 mole % ethylene glycol; about 15 to about 27 mole % 2,2,4,4-tetramethyl-1,3-cyclobutanediol and about 73 to about 85 mole % ethylene glycol; about 15 to about 26 mole % 2,2,4,4-tetramethyl-1,3-cyclobutanediol and about 74 to about 85 mole % ethylene glycol; about 15 to about 25 mole % 2,2,4,4-tetramethyl-1,3-cyclobutanediol and about 75 to about 85 mole % ethylene glycol; about 15 to about 24 mole % 2,2,4,4-tetramethyl-1,3-cyclobutanediol and about 76 to about 85 mole % ethylene glycol; or about 15 to about 23 mole % 2,2,4,4-tetramethyl-1,3-cyclobutanediol and about 77 to about 85 mole % ethylene glycol; or about 14 to about 30 mole % 2,2,4,4-tetramethyl-1,3-cyclobutanediol and about 70 to about 86 mole % ethylene glycol; or about 14 to about 29 mole % 2,2,4,4-tetramethyl-1,3-cyclobutanediol and about 71 to about 86 mole % ethylene glycol; or about 14 to about 28 mole % 2,2,4,4-tetramethyl-1,3-cyclobutanediol and about 72 to about 86 mole % ethylene glycol; or about 14 to about 27 mole % 2,2,4,4-tetramethyl-1,3-cyclobutanediol and about 73 to about 86 mole % ethylene glycol; or about 14 to about 26 mole % 2,2,4,4-tetramethyl-1,3-cyclobutanediol and about 74 to about 86 mole % ethylene glycol; or about 14 to about 25 mole % 2,2,4,4-tetramethyl-1,3-cyclobutanediol and about 75 to about 86 mole % ethylene glycol; or about 14 to about 24 mole % 2,2,4,4-tetramethyl-1,3-cyclobutanediol and about 76 to about 86 mole % ethylene glycol; or about 14 to about 23 mole % 2,2,4,4-tetramethyl-1,3-cyclobutanediol and about 77 to about 86 mole % ethylene glycol; or about 13 to about 30 mole % 2,2,4,4-tetramethyl-1,3-cyclobutanediol and about 70 to about 87 mole % ethylene glycol; or about 13 to about 29 mole % 2,2,4,4-tetramethyl-1,3-cyclobutanediol and about 71 to about 87 mole % ethylene glycol; or about 13 to about 28 mole %, 2,2,4,4-tetramethyl-1,3-cyclobutanediol and about 72 to about 87 mole % ethylene glycol; or about 13 to about 27 mole % 2,2,4,4-tetramethyl-1,3-cyclobutanediol and about 73 to about 87 mole % ethylene glycol; or about 13 to about 26 mole % 2,2,4,4-tetramethyl-1,3-cyclobutanediol and about 74 to about 87 mole % ethylene glycol; or about 13 to about 25 mole % 2,2,4,4-tetramethyl-1,3-cyclobutanediol and about 75 to about 87 mole % ethylene glycol; or about 13 to about 24 mole % 2,2,4,4-tetramethyl-1,3-cyclobutanediol and about 76 to about 87 mole % ethylene glycol; or about 13 to about 23 mole % 2,2,4,4-tetramethyl-1,3-cyclobutanediol and about 77 to about 87 mole % ethylene glycol; or about 12 to about 30 mole % 2,2,4,4-tetramethyl-1,3-cyclobutanediol and about 70 to about 88 mole % ethylene glycol; or about 12 to about 29 mole % 2,2,4,4-tetramethyl-1,3-cyclobutanediol and about 71 to about 88 mole % ethylene glycol; or about 12 to about 28 mole % 2,2,4,4-tetramethyl-1,3-cyclobutanediol and about 72 to about 88 mole % ethylene glycol; or about 12 to about 27 mole % 2,2,4,4-tetramethyl-1,3-cyclobutanediol and about 73 to about 88 mole % ethylene glycol; about 12 to about 26 mole % 2,2,4,4-tetramethyl-1,3-cyclobutanediol and about 74 to about 88 mole % ethylene glycol; or about 12 to about 25 mole % 2,2,4,4-tetramethyl-1,3-cyclobutanediol and about 75 to about 88 mole % ethylene glycol; or about 12 to about 24 mole % 2,2,4,4-tetramethyl-1,3-cyclobutanediol and about 76 to about 88 mole % ethylene glycol; or about 12 to about 23 mole % 2,2,4,4-tetramethyl-1,3-cyclobutanediol and about 77 to about 88 mole % ethylene glycol; or about 11 to about 30 mole % 2,2,4,4-tetramethyl-1,3-cyclobutanediol and about 70 to about 89 mole % ethylene glycol; or about 11 to about 29 mole % 2,2,4,4-tetramethyl-1,3-cyclobutanediol and about 71 to about 89 mole % ethylene glycol; or about 11 to about 28 mole % 2,2,4,4-tetramethyl-1,3-cyclobutanediol and about 72 to about 89 mole % ethylene glycol; or about 11 to about 27 mole % 2,2,4,4-tetramethyl-1,3-cyclobutanediol and about 73 to about 89 mole % ethylene glycol; about 11 to about 26 mole % 2,2,4,4-tetramethyl-1,3-cyclobutanediol and about 74 to about 89 mole % ethylene glycol; or about 11 to about 25 mole % 2,2,4,4-tetramethyl-1,3-cyclobutanediol and about 75 to about 89 mole % ethylene glycol; or about 11 to about 24 mole % 2,2,4,4-tetramethyl-1,3-cyclobutanediol and about 76 to about 89 mole % ethylene glycol; or about 11 to about 23 mole % 2,2,4,4-tetramethyl-1,3-cyclobutanediol and about 77 to about 89 mole % ethylene glycol; or about 10 to about 30 mole % 2,2,4,4-tetramethyl-1,3-cyclobutanediol and about 70 to about 90 mole % ethylene glycol; or about 10 to about 29 mole % 2,2,4,4-tetramethyl-1,3-cyclobutanediol and about 71 to about 90 mole % ethylene glycol; or about 10 to about 28 mole % 2,2,4,4-tetramethyl-1,3-cyclobutanediol and about 72 to about 90 mole % ethylene glycol; or about 10 to about 27 mole % 2,2,4,4-tetramethyl-1,3-cyclobutanediol and about 73 to about 90 mole % ethylene glycol; about 10 to about 26 mole % 2,2,4,4-tetramethyl-1,3-cyclobutanediol and about 74 to about 90 mole % ethylene glycol; or about 10 to about 25 mole % 2,2,4,4-tetramethyl-1,3-cyclobutanediol and about 75 to about 90 mole % ethylene glycol; or about 10 to about 24 mole % 2,2,4,4-tetramethyl-1,3-cyclobutanediol and about 76 to about 90 mole % ethylene glycol; or about 10 to about 23 mole % 2,2,4,4-tetramethyl-1,3-cyclobutanediol and about 77 to about 90 mole % ethylene glycol; or about 5 to about 30 mole % 2,2,4,4-tetramethyl-1,3-cyclobutanediol and about 70 to about 95 mole % ethylene glycol; or about 5 to about 29 mole % 2,2,4,4-tetramethyl-1,3-cyclobutanediol and about 71 to about 95 mole % ethylene glycol; or about 5 to about 28 mole % 2,2,4,4-tetramethyl-1,3-cyclobutanediol and about 72 to about 95 mole % ethylene glycol; or about 5 to about 27 mole % 2,2,4,4-tetramethyl-1,3-cyclobutanediol and about 73 to about 95 mole % ethylene glycol; about 5 to about 26 mole % 2,2,4,4-tetramethyl-1,3-cyclobutanediol and about 74 to about 95 mole % ethylene glycol; or about 5 to about 25 mole % 2,2,4,4-tetramethyl-1,3-cyclobutanediol and about 75 to about 95 mole % ethylene glycol; or about 5 to about 24 mole % 2,2,4,4-tetramethyl-1,3-cyclobutanediol and about 76 to about 95 mole % ethylene glycol.

In certain embodiments of the invention, the glycol component for the polyesters includes but is not limited to at least one of the following combinations of ranges: 10 to 30 mole % 2,2,4,4-tetramethyl-1,3-cyclobutanediol and 70 to 90 mole % ethylene glycol; 11 to 29 mole % 2,2,4,4-tetramethyl-1,3-cyclobutanediol and 71 to 89 mole % ethylene glycol; 11 to 28 mole % 2,2,4,4-tetramethyl-1,3-cyclobutanediol and 72 to 89 mole % ethylene glycol; 15 to 29 mole % 2,2,4,4-tetramethyl-1,3-cyclobutanediol and 71 to 85 mole % ethylene glycol; 15 to 28 mole % 2,2,4,4-tetramethyl-1,3-cyclobutanediol and 72 to 75 mole % ethylene glycol; 15 to 27 mole % 2,2,4,4-tetramethyl-1,3-cyclobutanediol and 73 to 75 mole % ethylene glycol; 18 to 27 mole % 2,2,4,4-tetramethyl-1,3-cyclobutanediol and 73 to 82 mole % ethylene glycol; 19 to 26 mole % 2,2,4,4-tetramethyl-1,3-cyclobutanediol and 74 to 81 mole % ethylene glycol; 20 to 25 mole % 2,2,4,4-tetramethyl-1,3-cyclobutanediol and 75 to 80 mole % ethylene glycol; or 21 to 24 mole % 2,2,4,4-tetramethyl-1,3-cyclobutanediol and 76 to 79 mole % ethylene glycol In certain embodiments, the polyesters useful in the invention can include but is not limited to residues of 2,2,4,4-tetramethyl-1,3-cyclobutanediol and ethylene glycol being present in one of the following amounts: about 10 to about 42 mole % 2,2,4,4-tetramethyl-1,3-cyclobutanediol and about 58 to about 90 mole % ethylene glycol; about 15 to about 42 mole % 2,2,4,4-tetramethyl-1,3-cyclobutanediol and about 58 to about 85 mole % ethylene glycol; about 20 to about 42 mole % 2,2,4,4-tetramethyl-1,3-cyclobutanediol and about 58 to about 80 mole % ethylene glycol; about 25 to about 42 mole % 2,2,4,4-tetramethyl-1,3-cyclobutanediol and about 58 to about 75 mole % ethylene glycol; about 30 to about 42 mole % 2,2,4,4-tetramethyl-1,3-cyclobutanediol and about 58 to about 70 mole % ethylene glycol; or about 30 to about 40 mole % 2,2,4,4-tetramethyl-1,3-cyclobutanediol and about 60 to about 70 mole % ethylene glycol; or about 34.2 to about 42 mole % 2,2,4,4-tetramethyl-1,3-cyclobutanediol and about 55.8 to about 65.8 mole % ethylene glycol; or about 34.2 to about 40 mole % 2,2,4,4-tetramethyl-1,3-cyclobutanediol and about 60 to about 65.8 mole % ethylene glycol.

In other aspects of the invention, the glycol component for the polyesters useful in the invention include but are not limited to at least one of the following combinations of ranges: about 10 to about 30 mole % 2,2,4,4-tetramethyl-1,3-cyclobutanediol and about 90 to about 70 mole % ethylene glycol; about 10 to about 29 mole % 2,2,4,4-tetramethyl-1,3-cyclobutanediol and about 90 to about 71 mole % ethylene glycol; about 10 to about 28 mole % 2,2,4,4-tetramethyl-1,3-cyclobutanediol and about 90 to about 72 mole % ethylene glycol; about 10 to about 27 mole % 2,2,4,4-tetramethyl-1,3-cyclobutanediol and about 90 to about 73 mole % ethylene glycol; about 15 to about 28 mole % 2,2,4,4-tetramethyl-1,3-cyclobutanediol and about 85 to about 72 mole % ethylene glycol; about 15 to about 26 mole % 2,2,4,4-tetramethyl-1,3-cyclobutanediol and about 85 to about 74 mole % ethylene glycol; about 18 to about 26 mole % 2,2,4,4-tetramethyl-1,3-cyclobutanediol and about 82 to about 77 mole % ethylene glycol; about 20 to about 25 mole % 2,2,4,4-tetramethyl-1,3-cyclobutanediol and about 80 to about 75 mole % ethylene glycol; about 21 to about 24 mole % 2,2,4,4-tetramethyl-1,3-cyclobutanediol and about 79 to about 76 mole % ethylene glycol; or about 22 to about 24 mole % 2,2,4,4-tetramethyl-1,3-cyclobutanediol and about 78 to about 76 mole % ethylene glycol.

In certain aspects of the invention, the glycol component of the polyester useful in the invention comprises 2,2,4,4-tetramethyl-1,3-cyclobutanediol (TMCD) residues in one of the following amounts: (i) about 10 to about 40 mole; (ii) about 10 to about 30 mole %; (iii) about 11 to about 29 mole %; (iv) about 11 to about 28 mole %; (v) about 11 to about 27 mole %; (vi) about 11 to about 26 mole %; (vii) about 15 to about 25 mole %; (viii) about 15 to about 28 mole %; (ix) about 20 to about 25 mole %; or (x) about 21 to about 24 mole %; wherein the remaining balance of the glycol component is either (a) ethylene glycol or (b) ethylene glycol and up to 30 mole %, or up to 20 mole %, or less than 20 mole %, or up to 10 mole %, or up to 8 mole %, or up to 5 mole %, or up to 2 mole % of modifying glycols.

In one embodiment, the polyesters useful in the invention can comprise 1,4-cyclohexanedimethanol. In one embodiment, the polyesters useful in the invention can comprise 1,4-cyclohexanedimethanol in the amount of less than 20 mole %. In another embodiment, the polyesters useful in the invention comprise 1,4-cyclohexanedimethanol and 1,3-cyclohexanedimethanol. The molar ratio of cis/trans 1,4-cyclohexandimethanol can vary within the range of 50/50 to 0/100, for example, between 40/60 to 20/80.

In one embodiment, the glycol component of the polyester portion of the polyester compositions useful in the invention can contain up to 10 mole %, or 9 mole %, or 8 mole %, or 7 mole %, or 6 mole %, or 5 mole %, or 4 mole %, or 3 mole %, or 2 mole %, or 1 mole %, or less of one or more modifying glycols which are not 2,2,4,4-tetramethyl-1,3-cyclobutanediol or ethylene glycol. In certain embodiments, the polyesters useful in the invention can contain 3 mole or less of one or more modifying glycols. In another embodiment, the polyesters useful in the invention can contain 30 mole % or less, 20 mole % or less, 15 mole % or less, 10 mole % or less, 5 mole % or less, or 2 mole % or less, of one or more modifying glycols. In another embodiment, the polyesters useful in the invention can contain 0 mole % modifying glycols. It is contemplated however that some other glycol residuals may form in situ.

In embodiments, modifying glycols for use in the polyesters, if used, can include dials other than 2,2,4,4-tetramethyl-1,3-cyclobutanediol and ethylene glycol and can contain 2 to 16 carbon atoms. Examples of modifying glycols include, but are not limited to, cyclohexanedimethanol, diethylene glycol, 1,2-propanediol, 1,3-propanediol, neopentyl glycol, isosorbide, 1,4-butanediol, 1,5-pentanediol, 1,6-hexanediol, p-xylene glycol, polytetramethylene glycol, and mixtures thereof. In one embodiment, isosorbide is a modifying glycol. In another embodiment, the modifying glycols include, but are not limited to, at least one of 1,3-propanediol and 1,4-butanediol. In one embodiment, 1,3-propanediol and/or 1,4-butanediol can be excluded. In one embodiment, at least one modifying glycol is diethylene glycol. In one embodiment, the diethylene glycol is not added as a separate monomer but is formed during polymerization. Diethylene glycol residues can be present in the polyester useful in the invention, whether or not formed in situ during processing or intentionally added, in any amount, for example, in the amount of 0.01 to 10 mole %, or 0.01 to 8 mole %, or 0.85 to 8 mole %, or 1 to 8 mole %.

In some embodiments, the polyesters according to the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the did or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. In embodiments, the polyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters useful in the invention can comprise at least one chain extender. Suitable chain extenders include, but are not limited to, multifunctional (including, but not limited to, bifunctional) isocyanates, multifunctional epoxides, including for example epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

It is contemplated that compositions useful in the invention can possess at least one of the inherent viscosity ranges described herein and at least one of the monomer ranges for the compositions described herein unless otherwise stated. It is also contemplated that compositions useful in the invention can possess at least one of the Tg ranges described herein and at least one of the monomer ranges for the compositions described herein unless otherwise stated. It is also contemplated that compositions useful in the invention can possess at least one of the inherent viscosity ranges described herein, at least one of the Tg ranges described herein, and at least one of the monomer ranges for the compositions described herein unless otherwise stated.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C.: 0.50 to 0.80 dL/g; 0.50 to 0.75 dL/g; 0.50 to 0.70 dL/g; 0.50 to 0.68 dL/g; 0.55 to 0.80 dL/g; 0.55 to 0.75 dL/g; 0.55 to 0.70 dL/g; 0.55 to 0.68 dL/g; 0.57 to 0.68 dL/g; 0.58 to 0.67 dL/g; 0.58 to 0.66 dL/g; 0.60 to 0.75 dL/g, 0.60 to 0.72 dL/g, 0.60 to 0.70 dL/g, or 0.60 to 0.68 dL/g; 0.57 to 0.73 dL/g; 0.58 to 0.72 dL/g; 0.59 to 0.71 dL/g; 0.60 to 0.70 dL/g; 0.61 to 0.69 dL/g; 0.62 to 0.68 dL/g; 0.63 to 0.67 dL/g; 0.64 to 0.66 dL/g: or about 0.65 dL/g.

The glass transition temperature (Tg) of the polyesters is determined using a TA DSC 2920 from Thermal Analyst Instrument at a scan rate of 20° C./min.

In certain embodiments, the oriented films or shrink films of the invention comprise polyesters/polyester compositions wherein the polyester has a Tg of 80 to 105° C.; or 80 to 100° C., or 80 to less than 100° C., 80 to 99° C., or 80 to 98° C., or 80 to 97° C. or 80 to 96° C., or 80 to 95° C. or 80 to 94° C., or 80 to 93° C. or 85 to 105° C., or 85 to 100° C., or 85 to less than 100° C., or 85 to 99° C., or 85 to 98° C., or 85 to 97° C. or 85 to 96° C., or 85 to 95° C., or 85 to 94° C., or 85 to 93° C., or 86 to 100° C.; or 86 to less than 100° C. or 86 to 100° C.; or 86 to less than 100° C., or 86 to 99° C., or 86 to 98° C., or 86 to 97° C. or 86 to 96° C., or 86 to 95° C., or 86 to 94° C., or 86 to 93° C., or 87 to 99° C., or 87 to 98° C., or 87 to 97° C. or 87 to 96° C., or 87 to 95° C., or 87 to 94° C., or 87 to 93° C., or 88 to 99° C., or 88 to 98° C., or 88 to 97° C. or 88 to 96° C., or 88 to 95° C., or 88 to 94° C., or 88 to 93° C., or 90 to 95° C., or 91 to 95° C., or 92 to 94° C. In certain embodiments of the invention, the Tg of the polyesters can be chosen from one of the following ranges: Tg of 80 to 105° C.; or 80 to 100° C.; or 80 to less than 100° C.; or 85 to less than 100° C.; or 85 to 100° C.; 86 to 99° C.; 87 to 98° C.; 88 to 97° C.; 89 to 96° C.; 90 to 95° C.; 91 to 95° C.; 92 to 94° C. In certain embodiments, these Tg ranges can be met with or without at least one plasticizer being added during polymerization.

In embodiments of the invention, the polyester can comprise: a glycol component that includes 15 to 28 mole % 2,2,4,4-tetramethyl-1,3-cyclobutanediol and 72 to 85 mole % ethylene glycol, an inherent viscosity of 0.60 to 0.70 dL/g and a Tg of 90 to 96° C.; or a glycol component that includes 15 to 28 mole % 2,2,4,4-tetramethyl-1,3-cyclobutanediol and 76 to 85 mole % ethylene glycol, an inherent viscosity of 0.63 to 0.67 dL/g and a Tg of 92 to 94° C.

In one embodiment, certain polyesters useful in the invention can exhibit a flexural modulus at 23° C. equal to or greater than 2000 MPa (290,000 psi) as defined by ASTM D790. In another embodiment, certain polyesters useful in the invention can exhibit a flexural modulus at 23° C. from about 2000 MPa (290,000 psi) to about 2551 MPa (370,000 psi) as defined by ASTM D790. In another embodiment, certain polyesters useful in the invention can exhibit a flexural modulus at 23° C. from about 2000 MPa (290,000 psi) to about 2413 MPA (350,000 psi) as defined by ASTM D790.

Notched Izod impact strength, as described in ASTM D256, is a common method of measuring toughness. Notched Izod impact strength is measured herein at 23° C. with a 10-mil notch in a 3.2 mm (⅛-inch) thick bar determined according to ASTM D256. In one embodiment, certain polyesters useful in the invention can exhibit a notched Izod impact strength of at least 25 Jim (0.47 ft-lb/in) at 23° C. with a 10-mil notch in a 3.2 mm (⅛-inch) thick bar determined according to ASTM D256. In one embodiment, certain polyesters useful in the invention can exhibit a notched Izod impact strength of from about 25 J/m (0.47 ft-lb/in) to about 75 J/m (1.41 ft-lb/in) at 23° C. with a 10-mil notch in a 3.2 mm (⅛-inch) thick bar determined according to ASTM 0256. In another embodiment, certain polyesters useful in the invention can exhibit a notched Izod impact strength of from about 50 J/m (0.94 ft-lb/in) to about 75 J/m (1.41 ft-lb/in) at 23° C. with a 10-mil notch in a 3.2 mm (⅛-inch) thick bar determined according to ASTM D256.

Certain polyesters useful in the oriented films of the invention can possess at least one of the following properties: a Tg of from about 85 to about 100° C. as measured by a TA 2100 Thermal Analyst Instrument at a scan rate of 20° C./min; a flexural modulus at 23° C. equal to or greater than 2000 MPa (290,000 psi) as defined by ASTM D790; and a notched Izod impact strength equal to or greater than 25 J/m (0.47 ft-lb/in) according to ASTM D256 with a 10-mil notch using a ⅛-inch thick bar at 23° C.

In embodiments of the invention, certain oriented films and/or shrink films comprising the polyesters and/or polyester compositions useful in the invention can have a unique combination of all of the following properties: good stretch ability, shrinkage properties, certain notched Izod impact strength, certain inherent viscosities, certain glass transition temperature (Tg), certain flexural modulus, certain densities, certain tensile modulus, certain surface tension, good melt viscosity, good clarity, and good color.

In one embodiment, certain polyester compositions useful in this invention can be visually clear. The term "visually clear" is defined herein as an appreciable absence of cloudiness, haziness, and/or muddiness, when inspected visually.

In one embodiment, the polyesters useful in the invention and/or the polyester compositions useful in the invention, [in one embodiment, in the presence of and/or in the absence of toner(s)], can have color values L*, a* and b* which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate.

In certain embodiments, the b* values for the polyesters useful in the invention, can be from −12 to less than 12 and the L* values can be from greater than 80, or greater than 85, or greater than 90, or greater than 91, or greater than 92, or greater than 93, or greater than 94, or greater than 95. In other embodiments, the b* values for the polyesters useful in the invention can be present in one of the following ranges: from −10 to 10; −10 to less than 10; −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2. In other embodiments, the L* value for the polyesters useful in the invention can be present in one of the following ranges: 80 to 98; 85 to 98; 90 to 98; greater than 90 to 98; 91 to 98; 92 to 98; 93 to 98; 94 to 98; 95 to 98; 91 to 97; 92 to 97; 93 to 97; 94 to 97; 95 to 97; 91 to 96; 92 to 96; 93 to 96; or 94 to 96. The L* color value for the polyester can be 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve.

The L* value for the oriented films or shrink films of the invention can be 90 or greater, as determined by the L*a*b* color system measured following ASTM 6290-98 and ASTM E308-99, using measurements from a Hunter Lab Ultrascan XE Spectrophotometer with the following parameters: (1) D65 illuminant, (2) 10 degree observer, (3) transmittance mode with specular angle included, (4) large area view, (5) 1" port size, and where the measurements were performed on film.

In one embodiment, copolyesters containing 2,2,4,4-tetramethyl-1,3-cyclobutanediol and ethylene glycol over a range of compositions can be prepared with a titanium catalyst or mixture of titanium and manganese catalysts.

It is believed that the color of these copolyesters can be improved with the addition during polymerization of certain levels of phosphorus containing compounds/stabilizers. The present invention relates to polyesters based on terephthalic acid, 2,2,4,4-tetramethyl-1,3-cyclobutanediol and ethylene glycol catalyzed by certain catalyst types and/or amounts that provide improved properties (as discussed herein), and in certain embodiments a titanium catalyst, or in certain other embodiments a combination of titanium and manganese catalysts, stabilized by phosphorous compounds resulting in good TMCD incorporation, improved color (higher brightness and/or less yellow), and reactivity to achieve desired inherent viscosity (IV) over the compositional range described herein.

When titanium is added to the polyesters and/or polyester compositions and/or process of making the polyesters useful in the invention, it is added to the process of making the polyester in the form of a titanium compound. The amount of the titanium compound added to the polyesters useful in the invention and/or polyester compositions useful in the invention can be measured in the form of titanium atoms present in the final polyester, for example, by weight measured in ppm.

When manganese is added to the polyesters and/or polyester compositions and/or process of making the polyesters of the invention, it is added to the process of making the polyester in the form of a manganese compound. The amount of the manganese compound added to the polyesters useful in the invention and/or polyester compositions useful in the invention can be measured in the form of manganese atoms present in the final polyester, for example, by weight measured in ppm.

When phosphorus is added to the polyesters and/or polyester compositions and/or process of making the polyesters useful in the invention, it is added to the process of making the polyester in the form of a phosphorus compound. In one embodiment, this phosphorus compound can comprise at least one phosphate ester(s). The amount of phosphorus compound, [for example, phosphate ester(s)] added to the polyesters useful in the invention and/or polyester compositions useful in the invention can be measured in the form of phosphorus atoms present in the final polyester, for example, by weight measured in ppm.

In one embodiment, the phosphorus compound(s) can be an organic compound such as, for example, a phosphorus acid ester containing halogenated or non-halogenated organic substituents. In embodiments, the phosphorus compound(s) can comprise a wide range of phosphorus compounds, for example, phosphines, phosphites, phosphinites, phosphonites, phosphinates, phosphonates, phosphine oxides, and phosphates.

Examples of phosphorus compounds that may be useful in the invention can include tributyl phosphate, triethyl phosphate, tri-butoxyethyl phosphate, t-butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine. In one embodiment, triphenyl phosphine oxide is excluded as a thermal stabilizer in the process(es) of making the polyesters useful in the invention and/or in the polyester composition(s) useful in the invention.

In one embodiment, phosphorus compounds useful in the invention can be any of the previously described phosphorus-based acids wherein one or more of the hydrogen atoms of the acid compound (bonded to either oxygen or phosphorus atoms) are replaced with alkyl, branched alkyl, substituted alkyl, alkyl ethers, substituted alkyl ethers, alkylaryl, alkyl-substituted aryl, aryl, substituted aryl, and mixtures thereof. In another embodiment, phosphorus compounds useful in the invention, include but are not limited to, the above described compounds wherein at least one of the hydrogen atoms bonded to an oxygen atom of the compound is replaced with a metallic ion or an ammonium ion.

The esters can contain alkyl, branched alkyl, substituted alkyl, alkyl ethers, aryl, and/or substituted aryl groups. The esters can also have at least one alkyl group and at least one aryl group. The number of ester groups present in the particular phosphorus compound can vary from zero up to the maximum allowable based on the number of hydroxyl groups present on the phosphorus compound used. For example, an alkyl phosphate ester can include one or more of the mono-, di-, and tri alkyl phosphate esters; an aryl phosphate ester includes one or more of the mono-, di-, and tri aryl phosphate esters; and an alkyl phosphate ester and/or an aryl phosphate ester also include, but are not limited to, mixed alkyl aryl phosphate esters having at least one alkyl and one aryl group.

In one embodiment, the phosphorus compounds useful in the invention include but are not limited to alkyl, aryl or mixed alkyl aryl esters or partial esters of phosphoric acid, phosphorus acid, phosphinic acid, phosphonic acid, or phosphonous acid. The alkyl or aryl groups can contain one or more substituents.

In one aspect, the phosphorus compounds useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed aryl alkyl phosphites, reaction products thereof, and mixtures thereof. The phosphate esters include esters in which the phosphoric acid is fully esterified or only partially esterified.

In one aspect, the phosphorus compounds useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, reaction products thereof, and mixtures thereof. The phosphate esters include esters in which the phosphoric acid is fully esterified or only partially esterified.

In one embodiment, for example, the phosphorus compounds useful in the invention can include at least one phosphate ester.

In another embodiment, the phosphate esters useful in the invention can include but are not limited to alkyl phosphate esters, aryl phosphate esters, mixed alkyl aryl phosphate esters, and/or mixtures thereof.

In certain embodiments, the phosphate esters useful in the invention are those where the groups on the phosphate ester include are alkyl, alkoxy-alkyl, phenyl, or substituted phenyl groups. These phosphate esters are generally referred to herein as alkyl and/or aryl phosphate esters. Certain preferred embodiments include trialkyl phosphates, triaryl phosphates, alkyl diaryl phosphates, dialkyl aryl phosphates, and mixtures of such phosphates, wherein the alkyl groups are preferably those containing from 2 to 12 carbon atoms, and the aryl groups are preferably phenyl.

Representative alkyl and branched alkyl groups are preferably those containing from 1-12 carbon atoms, including, but not limited to, ethyl, propyl, isopropyl, butyl, hexyl, cyclohexyl, 2-ethylhexyl, octyl, decyl and dodecyl. Substituted alkyl groups include, but are not limited to, those containing at least one of carboxylic acid groups and esters thereof, hydroxyl groups, amino groups, keto groups, and the like.

Representative of alkyl-aryl and substituted alkyl-aryl groups are those wherein the alkyl portion contains from 1-12 carbon atoms, and the aryl group is phenyl or substituted phenyl wherein groups such as alkyl, branched alkyl, aryl, hydroxyl, and the like are substituted for hydrogen at any carbon position on the phenyl ring. Preferred aryl groups include phenyl or substituted phenyl wherein groups such as alkyl, branched alkyl, aryl, hydroxyl and the like are substituted for hydrogen at any position on the phenyl ring.

In one embodiment, the phosphate esters useful in the invention include but are not limited to dibutylphenyl phosphate, triphenyl phosphate, tricresyl phosphate, tributyl phosphate, tri-2-ethylhexyl phosphate, trioctyl phosphate, and/or mixtures thereof, including particularly mixtures of tributyl phosphate and tricresyl phosphate, and mixtures of isocetyl diphenyl phosphate and 2-ethylhexyl diphenyl phosphate.

In one embodiment, at least one phosphorus compound useful in the invention comprises at least one aryl phosphate ester.

In one embodiment, at least one phosphorus compound useful in the invention comprises at least one unsubstituted aryl phosphate ester.

In one aspect, at least one phosphorus compound useful in the invention comprises at least one aryl phosphate ester which is not substituted with benzyl groups.

In one aspect, any of the phosphorus compounds useful in the invention may comprise at least one alkyl phosphate ester.

In one embodiment, the phosphate esters useful in the invention as thermal stabilizers and/or color stabilizers include but are not limited to, at least one of the following: trialkyl phosphates, triaryl phosphates, alkyl diaryl phosphates, and mixed alkyl aryl phosphates.

In one embodiment, the phosphate esters useful in the invention as thermal stabilizers and/or color stabilizers include but are not limited to, at least one of the following: triaryl phosphates, alkyl diaryl phosphates, and mixed alkyl aryl phosphates.

In one embodiment, the phosphate esters useful as thermal stabilizers and/or color stabilizers in the invention can include but are not limited to, at least one of the following: triaryl phosphates and mixed alkyl aryl phosphates.

In one embodiment, at least one phosphorus compound useful in the invention can comprise, but is not limited to, triaryl phosphates, such as, for example, triphenyl phosphate. In one embodiment, at least one thermal stabilizer comprises, but is not limited to Merpol A. In one embodiment, at least one thermal stabilizer useful in the invention comprises, but is not limited to, at least one of triphenyl phosphate and Merpol A. Merpol A is a phosphate ester commercially available from Stepan Chemical Co and/or E.I. duPont de Nemours & Co. The CAS Registry number for Merpol A is believed to be CAS Registry #37208-27-8.

In one aspect, any of the phosphorus compounds useful in the invention may comprise at least one triaryl phosphate ester which is not substituted with benzyl groups.

In one embodiment, the polyester compositions useful in invention may comprise 2-ethylhexyl diphenyl phosphate.

In one embodiment, any of the processes described herein for making any of the polyester compositions and/or polyesters can comprise at least one mixed alkyl aryl phosphite, such as, for example, bis(2,4-dicumylphenyl)pentaerythritol diphosphite also known as Doverphos S-9228 (Dover Chemicals, CAS #15486243-8).

In one embodiment, any of the processes described herein for making any of the polyester compositions and/or polyesters can comprise at least one phosphine oxide.

In one embodiment, any of the processes described herein for making any of the polyester compositions and/or polyesters can comprise at least one salt of phosphoric acid such as, for example, KH2PO4 and Zn3(PO4)2.

The term "thermal stabilizer" is intended to include the reaction product(s) thereof. The term "reaction product" as used in connection with the thermal stabilizers in the polyesters useful in the invention refers to any product of a polycondensation or esterification reaction between the thermal stabilizer and any of the monomers used in making the polyester as well as the product of a polycondensation or esterification reaction between the catalyst and any other type of additive.

In one embodiment of the invention, the phosphorus compounds useful in the polyesters of the invention may act as thermal stabilizers. In one embodiment of the invention, the phosphorus compounds useful in the invention may not act as a thermal stabilizer but may act as a color stabilizer. In one embodiment of the invention, the phosphorus compounds useful in the invention may act as both a thermal stabilizer and a color stabilizer.

When phosphorus is added to the polyesters and/or polyester compositions and/or process of making the polyesters useful in the invention, it is added in the form of a phosphorus compound, for example, at least one phosphate ester(s). The amount of phosphorus compound(s), (for example, at least one phosphate ester), is added to the polyesters useful in the invention and/or polyester compositions useful in the invention and/or processes of making the polyesters useful in the invention can be measured in the form of phosphorus atoms present in the final polyester, for example, by weight measured in ppm.

In one embodiment, amounts of the phosphate ester useful in making the polyesters useful in the invention added during polymerization are chosen from the following: 10 to 200 ppm based on the total weight of the polyester composition and as measured in the form of phosphorus atoms in the final polyester. In embodiments of the polyesters useful in the invention, phosphorous can be present in an amount of 10 to 100, or 10 to 80, or 10 to 60, or 10 to 55, or 15 to 55, or 18 to 52, or 20 to 50 ppm, based on the total weight of the polyester composition and as measured in the form of phosphorus atoms in the final polyester.

In one embodiment, the catalyst system contains a titanium compound. In one embodiment, the titanium compound can be used in either the esterification reaction or the polycondensation reaction or both reactions. In one embodiment, the catalyst system contains a titanium compound used in the esterification reaction. In one embodiment, the catalyst system contains a titanium compound used in the polycondensation reaction. In one embodiment, less than about 50 ppm elemental titanium can be present as residue in the polyester based on the total weight of the polyester.

In embodiments, titanium amounts can range from 10 ppm to 50 ppm based on the catalyst metal and based on the weight of the final polymer. In embodiments of making the polyesters useful in the invention, titanium can be present in an amount of 15 to 48, or 15 to 45, or 20 to 35, or 20 to 30, or 15 to 30 ppm, based on the total weight of the polyester composition and as measured in the form of titanium atoms in the final polyester. The process can be carried out in either a batch or continuous process. In one embodiment, the process is carried out in a continuous process.

When titanium is added to the polyesters and/or polyester compositions and/or process of making the polyesters useful in the invention, it is added to the process of making the polyester in the form of a titanium compound. The amount of the titanium compound added to the polyesters useful in the invention and/or polyester compositions useful in the invention and/or processes for making the polyesters useful in the invention can be measured in the form of titanium atoms present in the final polyester, for example, by weight measured in ppm.

In another embodiment, the catalyst mixture contains a titanium compound used in the esterification reaction in the amount of 10 ppm to 50 ppm based on the weight of the final polyester, as measured in the form of titanium atoms in the final polyester.

The titanium-containing compounds useful in this invention include any compound containing titanium including but not limited to: tetraethyl titanate, acetyltripropyl titanate, tetrapropyl titanate, tetrabutyl titanate, polybutyl titanate, 2-ethylhexyltitanate, octyleneglycol titanate, lactate titanate, triethanolamine titanate, acetylacetonate titanate, ethylacetoacetic ester titanate, isostearyl titanate, acetyl triisopropyl titanate, titanium tetraisopropoxide titanium glycolates, titanium butoxide, hexylene glycol titanate, and tetraisooctyl titanate, titanium dioxide, titanium dioxide/silicon dioxide coprecipitates, and titanium dioxide/zirconium dioxide coprecipitates. This invention includes but is not limited to the titanium dioxide/silicon dioxide coprecipitate catalyst described in U.S. Pat. No. 6,559,272.

In one embodiment, the catalyst mixture contains a magnesium compound. In one embodiment, the manganese compound can be used in either the esterification reaction or the polycondensation reaction or both reactions. In one embodiment, the catalyst system contains a manganese compound used in the esterification reaction. In one embodiment, the catalyst mixture contains a manganese compound used in the polycondensation reaction. Generally, in one embodiment, less than about 100 ppm elemental manganese can be present as residue in the polyester based on the total weight of the polyester.

Manganese amounts can range from 10 ppm to 100 ppm based on the catalyst metal and based on the weight of the final polymer. In embodiments of the invention, manganese can be present in the polyester in an amount of 10 to 60, or 10 to 55, or 11 to 55, or 15 to 55 ppm, based on the total weight of the polyester composition and as measured in the form of manganese atoms in the final polyester. The process can be carried out in either a batch or continuous process. In one embodiment, the process is carried out in a continuous process.

In embodiments, manganese can be added in the form of a manganese salt. In embodiments, examples of useful manganese salts include manganese(II) diacetate, manganese benzoate, manganese octoate, manganese caproate, manganese 2-diethyl hexoate, manganese lineolate, manganese stearate, manganese naphthenate, and combinations thereof.

In one embodiment, suitable catalysts for use in the processes of making the polyesters useful in the invention include at least one titanium compound and one manganese compound. In certain embodiments, other catalysts could possibly be used in the invention in combination with the at least one titanium compound and the at least one manganese compound. Other catalysts may include, but are not limited to, those based on gallium, zinc, antimony, cobalt, magnesium, germanium, lithium, aluminum compounds, and an aluminum compound with lithium hydroxide or sodium hydroxide.

The polyester portion of the polyester compositions useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No.

3,772,405 for methods of producing polyesters, the disclosure regarding such methods is hereby incorporated herein by reference.

The polyester in general may be prepared by condensing the dicarboxylic acid or dicarboxylic acid ester with the glycol in the presence of the titanium catalyst (and optionally titanium and manganese catalysts), as described herein, at elevated temperatures increased gradually during the course of the condensation up to a temperature of about 225°-310° C., in an inert atmosphere, and conducting the condensation at low pressure during the latter part of the condensation, as described in further detail in U.S. Pat. No. 2,720,507 incorporated herein by reference herein.

In embodiments of making the polyesters useful in making the invention, at least one phosphorus compound, reaction products thereof, and mixtures thereof can be added either during esterification, polycondensation, or both and/or it can be added post-polymerization. In one embodiment, the phosphorus compound useful in any of the processes of making the polyester useful in the invention can be added during esterification. In one embodiment, if the phosphorus compound added after both esterification and polycondensation, it is added in the amount of 0 to 2 weight % based on the total weight of the final polyester. In one embodiment, if the phosphorus compound added after both esterification and polycondensation, it is added in the amount of 0.01 to 2 weight % based on the total weight of the final polyester in one embodiment, the phosphorus compound can comprise at least one phosphate ester. In one embodiment, the phosphorus compound can comprise at least one phosphorus compound which is added during the esterification step. In one embodiment, the phosphorus compound can comprise at least one phosphate ester, for example, which is added during the esterification step.

In one aspect, the polyesters, polyester compositions useful in the invention can comprise phosphorus atoms, titanium atoms, and manganese atoms.

In one embodiment, the polyester(s), polyester compositions useful in the invention may comprise at least one titanium compound, at least one manganese compound, and at least one phosphorus compound.

In one embodiment, the weight ratio of total phosphorus atoms to total titanium and manganese atoms in the final polyester can be 0.5-2.0:1. In embodiments of the invention, phosphorus is present in a weight ratio of total phosphorus atoms to total titanium and manganese atoms in the final polyester of 0.1-5:1, or 0.2-5:1, or 0.3-2:1, or 0.3-1:1, or 0.5-0.9:1, or 0.6-0.9:1, or 0.7-0.9:1, or 0.8-0.9:1.

In one embodiment, the amount of titanium atoms in the polyesters useful in the invention can be from 15 to 50 ppm titanium atoms based on the weight of the final polyester.

In one embodiment, the amount of manganese atoms in the polyesters useful in the invention can be from 10 to 100 ppm manganese atoms based on the weight of the final polyester.

In one embodiment, the amount of phosphorus atoms in the polyesters useful in the invention can be from 10 to 200 ppm phosphorus atoms based on the weight of the final polyester.

In embodiments of the process for making the polyesters useful in the invention, certain agents which colorize the polymer can be added to the melt. In one embodiment, a bluing toner is added to the melt in order to reduce the b* of the resulting polyester polymer melt phase product. Such bluing agents include blue inorganic and organic toner(s). In addition, red toner(s) can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added can depend on the amount of inherent yellow color in the base polyester and the efficacy of the toner. In one embodiment, a concentration of up to about 15 ppm of combined organic toner components and a minimum concentration of about 0.5 ppm are used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor.

The invention further relates to a polymer blend. The blend comprises:
(a) from 5 to 95 weight % of at least one of the polyesters described above; and
(b) from 5 to 95 weight % of at least one of the polymeric components.

Suitable examples of the polymeric components include, but are not limited to, nylon; polyesters different than those described herein such as PET or modified PET (PETG); polyamides such as ZYTEL® from DuPont; polystyrene; polystyrene copolymers; styrene acrylonitrile copolymers; acrylonitrile butadiene styrene copolymers; poly(methyl methacrylate); acrylic copolymers; poly(ether-imides) such as ULTEM® (a poly(ether-imide) from General Electric); polyphenylene oxides such as poly(2,6-dimethylphenylene oxide) or poly(phenylene oxide)/polystyrene blends such as NORYL 1000® (a blend of poly(2,6-dimethylphenylene oxide) and polystyrene resins from General Electric); polyphenylene sulfides; polyphenylene sulfide/sulfones; poly (ester-carbonates); polycarbonates such as LEXAN® (a polycarbonate from General Electric); polysulfones; polysulfone ethers; and poly(ether-ketones) of aromatic dihydroxy compounds; or mixtures of any of the foregoing polymers. The blends can be prepared by conventional processing techniques known in the art, such as melt blending or solution blending.

In embodiments, the polyester compositions and the polymer blend compositions can also contain from 0.01 to 25% by weight of the overall composition common additives such as colorants, toner(s), dyes, mold release agents, flame retardants, plasticizers, nucleating agents, stabilizers, including but not limited to, UV stabilizers, thermal stabilizers other than the phosphorus compounds describe herein, and/or reaction products thereof, fillers, and impact modifiers. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

Reinforcing materials may be added to the compositions useful in this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

Generally, the shrink film according to the invention may contain from 0.01 to 10 weight percent of the polyester plasticizer. In one embodiment, the shrink film can contain from 0.1 to 5 weight percent of the polyester plasticizer. Generally, the shrink film can contain from 90 to 99.99 weight percent of the copolyester. In certain embodiments, the shrink film can contain from 95 to 99.9 weight percent of the copolyester.

In one aspect, the invention relates to the oriented film(s) and/or shrink film(s) of the invention comprising the polyester compositions and/or polymer blends useful in the invention. The methods of forming the polyesters and/or blends into film(s) and/or sheet(s) are well known in the art. Examples of film(s) and/or sheet(s) useful the invention including but not limited to extruded film(s) and/or sheet(s), compression molded film(s), calendered film(s) and/or sheet (s), solution casted film(s) and/or sheet(s). In one aspect, methods of making film and/or sheet useful to produce the oriented films and/or shrink films of the invention include but are not limited to extrusion, compression molding, calendering, and solution casting The shrink initiation (shrink onset) temperature of the polyesters useful in the invention can be 70° C. or greater, or 75° C. or greater, or from 70° C. to 90° C., or from 75° C. to 90° C., or from 75° C. to 85° C., or from 78° C. to 82° C., or at about 80° C.

In another embodiment, the shrink film useful in the invention can have a shrink onset temperature as described and does not shrink additionally when exposed to temperatures above the shrink initiation temperature or shrink initiation temperature range.

In certain embodiments, the polyester composition useful in the invention has a density of 1.6 g/cc or less, or 1.5 g/cc or less, or 1.4 g/cc or less, or 1.1 g/cc to 1.5 g/cc, or 1.2 g/cc to 1.4 g/cc, or 1.2 g/cc to 1.35 g/cc.

In certain embodiments, the oriented or shrink films of the invention are initiated when the initial pre-shrunk film is oriented in one or more directions. The oriented films or shrink films of the invention can be made from films having any thickness depending on the desired end-use. The desirable conditions are, in one embodiment, where the oriented films and/or shrink films can be used to print ink onto for applications including labels, photo films which can be adhered to substrates such as paper, and/or other applications that it may be useful in. It may be desirable to coextrude the polyesters useful in the invention with another polymer, such as PET, to make the films useful in making the oriented films and/or shrink films of the invention. One advantage of doing the latter is that a tie layer may not be needed.

In one embodiment, the oriented films of the invention can be made from films having, for example, a thickness of from about 100 to 400 microns, for example, extruded or cast films, which are oriented at a ratio of 5:1 to 3:1 at a temperature of from 100° C. to 125° C. or from 104° C. to 114° C., for example, at a ratio of 5:1 or of 3:1 at a temperature from 104° C. to 114° C., which can be oriented to a thickness of from about 20 to 80 microns. In one embodiment, the pre-oriented film can have a thickness of 100 to 400 microns and the oriented films prior to shrinking can have a thickness of 20 to 80 microns. The orientation of the initial pre-shrunk film can be performed on a tenter frame according to these orientation conditions. The shrink films of the invention can be made from the oriented films of the invention.

In certain embodiments of the invention, the shrink films of the invention can have a shrink force of from 6 to 15 MPa, or from 8 to 15 MPa, or from 10 to 15 MPa, as measured by ISO Test Method 14616.

In certain embodiments of the invention, the shrink films of the invention can have transverse direction shrinkage of from 20% to 70% and from 2% shrinkage in the machine direction to 15% growth in the machine direction when immersed in water at 95° C. for 10 seconds.

In certain embodiments of the invention, the shrink films of the invention can have transverse direction shrinkage of from 20% to 65% and from 2% shrinkage in the machine direction to 15% growth in the machine direction when immersed in water at 95° C. for 10 seconds.

In certain embodiments of the invention, the shrink films of the invention can have transverse direction shrinkage of from 20% to 55% and from 3% to 15% growth in the machine direction when immersed in water at 95° C. for 10 seconds.

In certain embodiments of the invention, the shrink films of the invention can have shrinkage in the transverse direction in the amount of 35% to 85% and 4% shrinkage in the machine direction to 15% growth in the machine direction over a range of 95° C. to 125° C. in a hot air oven.

In certain embodiments of the invention, the shrink films of the invention can have shrinkage in the transverse direction in the amount of 40% to 80% and growth in the machine direction of 0 to 15% over a range of 95° C. to 125° C. in a hot air oven.

In certain embodiments of the invention, the shrink films of the invention can have shrinkage in the transverse direction in the amount of 40% to 75% and growth in the machine direction of 0 to 15% over a range of 95° C. to 125° C. in a hot air oven.

In certain embodiments of the invention, the shrink films of the invention can have a Young's modulus of from 1500 to 5000 MPa at stretching speeds of from 300 mm/minute to 500 mm/minute in the transverse direction according to ASTM Method D882.

In certain embodiments of the invention, the shrink films of the invention can have a Young's modulus of from 1500 to 2300 MPa at stretching speeds of from 300 mm/minute to 500 mm/minute in the machine direction according to ASTM Method D882.

In certain embodiments of the invention, the shrink films of the invention can have a shrink initiation temperature of from about 70 to about 90° C., or about 70 to about 85° C., or 75 to about 90° C. or about 75 to about 85° C., or about 70 to about 80° C.

In certain embodiments of the invention, the shrink films of the invention can have a shrink initiation temperature is between 75° C. and 85° C. In certain embodiments, the shrink film also does not shrink additionally when exposed to temperatures above 75° C. and 85° C.

In certain embodiments of the invention, the shrink films of the invention can have a break strain percentage of 15 to 170% at stretching speeds of from 300 mm/minute to 500 mm/minute in the transverse direction and/or the machine direction according to ASTM Method D882.

In certain embodiments, the shrink films of the invention can have a tensile stress at break (break stress) of from 30 to 270 MPa; or 40 to 260 MPa; or 42 to 260 MPa as measured according to ASTM Method D882.

In certain embodiments, the shrink films of the invention have gradual shrinkage with no wrinkling. In certain embodiments, the shrink films of the invention have no more than 30% shrinkage per each 5° C. temperature increase increment.

In one embodiment, when having a pre-oriented thickness of about 100 to 400 microns and then oriented on a tenter frame at from a ratio of 5:1 to 3:1 at a temperature of from 100° C. to 125° C. or at a temperature from 104° C. to 114° C. to a thickness of from about 20 to about 80 microns, the shrink films of the invention can have one or more of the following properties:
(1) transverse direction shrinkage of from about 20% to 70% and from 2% shrinkage in the machine direction to 15% growth in the machine direction when immersed in water at 95° C. for 10 seconds; (2) shrinkage in the transverse direction in the amount of 35% to 85% and 4% shrinkage in the machine direction to 15% growth in the machine direction over a range of 95 to 125° C. in a hot air oven; (3) a Young's modulus of from 1500 to 5000 MPa at stretching speeds of from 300 mm/minute to 500 mm/minute in the transverse direction according to ASTM Method D882 and a Young's modulus of from 1500 to 2300 MPa at stretching speeds of from 300 mm/minute to 500 mm/minute in the machine direction according to ASTM Method D882; (4) a shrink initiation temperature of from about 70° C. to about 90° C.; (5) a break strain percentage of 15% to 170% at stretching speeds of from 300 mm/minute to 500 mm/minute in the transverse direction or in the machine direction or in both directions according to ASTM Method D882; (6) no more than 30% shrinkage per each 5° C. temperature increase increment; and/or (7) an L* color value is 90 or greater, as determined by the L*a*b* color system measured following ASTM D 6290-98 and ASTM E308-99, using measurements from a Hunter Lab Ultrascan XE Spectrophotometer with the following parameters: (i) D65 illuminant, (ii) 10 degree observer, (iii transmittance mode with specular angle included, (iv) large area view, (v) 1" port size, and where the measurements were performed on film. Any combination of these properties or all of these properties can be present in the shrink films of the invention. The shrink films of the invention can have a combination of two or more of the above described shrink film properties. The shrink films of the invention can have a combination of three or more of the above described shrink film properties. The shrink films of the invention can have a combination of four or more of the above described shrink film properties. In certain embodiments, properties (1)-(3) are present. In certain embodiments, properties (1)-(4) are present. In certain embodiments, properties (1)-(4), and (7) are present, etc.

In certain embodiments, the shrink films according to the invention can have a shrinkage (when submerged in a 95° C. water bath for 10 seconds) of 20 to 70%, or 20 to 65%, or 20 to 60%, or 20 to 55% in the transverse direction and from either (1) 2% shrinkage in the machine direction to machine direction growth of greater than 5%; or (2) 2% shrinkage in the machine direction to machine direction growth of 15%; or (3) 3% to 15% growth in the machine direction; or (4) machine direction growth of from 5% to 15%; or (5) machine direction growth from 6% to 12%.

In one embodiment, the shrinkage percentages herein are based on initial pre-shrunk films having a thickness of about 20 to 80 microns that have been oriented at a ratio of from 5:1 to 3:1 at a temperature of 100° C. to 125° C. on a tenter frame, for example, at a ratio of 5:1 at a temperature from 104° C. to 114° C. In one embodiment, the shrinkage properties of the oriented film used to make the shrink film of this invention were not adjusted by annealing the film at a temperature higher than the temperature in which it was oriented (as shown in the Examples herein). In one embodiment, the shrinkage properties of the oriented film used to make the shrink films of this invention may be adjusted by annealing the oriented film at a temperature higher than the temperature in which it was oriented. Annealing the oriented film at a temperature higher than the temperature in which it was oriented may affect the shrink properties.

The shape of the film useful in making the oriented films or shrink films of the invention is not restricted in any way. For example, it may be a flat sheet or a tube. In order to produce the shrink films useful in the invention, the polyester is first made into a shaped film such as a flat sheet or a tube and then is "uniaxially oriented", meaning the polyester film is oriented in one direction or "biaxially oriented," meaning the polyester film is oriented in two different directions. Typically, but not always, the two directions are substantially perpendicular. For example, in the case of a film, the two directions are in the longitudinal or machine direction ("MD") of the film (the direction in which the film is produced on a film-making machine) and the transverse direction ("TD") of the film (the direction perpendicular to the MD of the film). Biaxially oriented articles may be sequentially oriented, simultaneously oriented, or oriented by some combination of simultaneous and sequential stretching.

The film may be oriented by any usual method, such as the roll stretching method, the long-gap stretching method, the tenter-stretching method, and the tubular stretching method. With use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also, the stretching may be done first in one direction and then in the other direction to result in effective biaxial stretching. In one embodiment, stretching of the film is done by preliminarily heating the film 5° C. to 80° C. above its glass transition temperature (Tg). In one embodiment, the film can be preliminarily heated to 10° C. to 36° C. above its Tg. In one embodiment, the stretch rate is from 5 to 20 inches (12.7 to 50.8 cm) per second. Next, the film can be oriented, for example, in either the machine direction, the transverse direction, or both from 2 to 6 times the original measurements. The film can be oriented as a single film layer or can be coextruded with another polyester such as PET (polyethylene terephthalate).

In one embodiment, the invention includes an article of manufacture or a shaped article comprising the shrink film of any of the shrink film embodiments of the invention. In another embodiment, the invention includes an article of manufacture or a shaped article comprising the oriented film of any of the oriented film embodiments of the invention.

In certain embodiments, the invention includes but is not limited to shrink films applied to containers, plastic bottles, glass bottles, packaging, batteries, hot fill containers, and/or industrial articles or other applications. In one embodiment, the invention includes but is not limited to oriented films applied to containers, packaging, plastic bottles, glass bottles, photo substrate such as paper, batteries, hot fill containers, and/or industrial articles or other applications.

In certain embodiments of the invention, the shrink films of the invention can be formed into a label or sleeve. The label or sleeve can then be applied to an article of manufacture, for example, the wall of a container, battery, or onto a sheet or film.

The oriented films or shrink films of the invention can be applied to shaped articles, such as, for example, sheet, film, tubes, bottles and are commonly used in various packaging applications. For example, film and sheet produced from polymers such as polyolefins, polystyrene, poly(vinyl chloride), polyesters and the like are used frequently for the manufacture of shrink labels for plastic beverage or food containers. For example, the shrink films of the invention can be used in many packaging applications where the shaped article exhibits properties such as, for example, good printability, high opacity, higher shrink force, good texture, and good stiffness.

The combination of the improved shrink properties as well as the improved temperature resistance due to increased Tg should offer new commercial options, including but not limited to, use for battery films, hot fill bottle labels, industrial applications, as well as for other shrink film applications where increased temperature stability is desirable.

The shrink films of the invention can be formed into a label for articles of manufacture, for example, a battery or for a hot fill container. In certain embodiments, the shrink films of the invention also meet the requirements of the battery fitness for use test which requires that the battery and label need to remain intact after 2 weeks exposure to 50% relative humidity at 70° C. This fitness for use for battery labels is performed at a temperature above the shrink initiation temperature (onset of shrinking). This generally means that the materials are still trying to shrink during the testing and tend to move during the process to expose the battery core to the environment. For batteries, failure to meet this fitness for use method is considered a shrink film failure.

One approach for reducing the density is to introduce many small voids or holes into the shaped article. This process is called "voiding" and may also be referred to as "cavitating" or "microvoiding". Voids are obtained by incorporating about 5 to about 50 weight % of small organic or inorganic particles or "inclusions" (referred in the art as "voiding" or "cavitation" agents) into a matrix polymer and orienting the polymer by stretching in at least one direction. During stretching, small cavities or voids are formed around the voiding agent. When voids are introduced into polymer films, the resulting voided film not only has a lower density than the non-voided film, but also becomes opaque and develops a paper-like surface. This surface also has the advantage of increased printability; that is, the surface is capable of accepting many inks with a substantially greater capacity over a non-voided film. Typical examples of voided films are described in U.S. Pat. Nos. 3,426,754; 3,944,699; 4,138,459; 4,582,752; 4,632,869; 4,770,931; 5,176,954; 5,435,955; 5,843,578; 6,004,664; 6,287,680; 6,500,533; 6,720,085; U.S. Patent Application Publication No.'s 2001/0036545; 2003/0068453; 2003/0165671; 2003/0170427; Japan Patent Application No.'s 61-037827; 63-193822; 2004-181863; European Patent No. 0 581 970 B1, and European Patent Application No. 0 214 859 A2.

The following examples further illustrate how the polyesters of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric.

EXAMPLES

The following examples illustrate in general how shrink films are prepared from polyesters useful in this invention and the effect of using 2,2,4,4-tetramethyl-1,3-cyclobutanediol and ethylene glycol as the material for shrink film as well as various shrink film properties associated therewith.

The inherent viscosity of the polyesters was determined in 60/40 (wt/wt) phenol/tetrachloroethane at a concentration of 0.5 g/100 ml at 25° C., and is reported in dL/g.

The glycol content was determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40 (wt/wt) phenol/tetrachloroethane with deuterated chloroform added for lock. Peak assignments for 2,2,4,4-tetramethyl-1,3-cyclobutanediol resonances were made by comparison to model mono- and dibenzoate esters of 2,2,4,4-tetramethyl-1,3-cyclobutanediol. These model compounds closely approximate the resonance positions found in the polymers and oligomers.

The polyester compositions (which includes the final compositions of blends of polyesters in Table 1) were cast at 250 microns thick. The compositional information is listed in Table 1 below. Also listed in Table 1 are the shrinkage percentages at 95'C for both transverse (TO) and machine (MD) film stretch directions. The film compositions were tested via NMR to determine the amount of CHDM, DEG and TMCD in each film. All films were oriented on a Bruckner tenter frame down to around 50 microns thick. Also documented was when a particular film substrate would not stretch as required and fractured.

Shrink percentages listed for TD are positive values meaning that the film shrank for the percentage listed. For the MD direction, positive values again shows shrinkage. However, a negative value means that the film expanded or grew in the machine direction. The Examples included in Table 1 originated from the pilot plant batches.

Examples 1-11

Blends of polyesters were used to produce the material for Polymers A-K. The compositions of Polymers A-K in all of the examples were determined internally using NMR (nuclear magnetic resonance spectroscopy) and are listed in Table 1. Table 1 data is reported for Polymers A-K where the polymers were cast at 250 microns thick. The shrinkage percentages at 95° C. for both transverse (TD) and machine (MD) film stretch directions were reported. The film compositions were tested via NMR to capture the amount of CHDM (1,4-cyclohexanedimethanol), DEG (diethylene glycol) and TMCD (2,2,4,4-tetramethyl-1,3-cyclobutanediol) in each film. All films in Table 1, Examples 1-11 were stretched on a Bruckner tenter frame down to around 50 microns thick, with the exception of films from Polymers D and K from Examples 4 and 11 which fractured and would not stretch.

TABLE 1

| EXAMPLE | POLYMER | MOLE % CHDM | MOLE % DEG | MOLE % TMCD | IV 1 | IV 2 | IV AVG | TD % @ 95 C. | MD % @ 95 C. | |
|---|---|---|---|---|---|---|---|---|---|---|
| 1 | Polymer A | 0 | 0.86 | 16.97 | 0.56 | 0.555 | 0.5575 | 46 | −6 | |
| 2 | Polymer B | 0 | 0.94 | 23.2 | 0.68 | | 0.68 | 60 | −8 | |
| 3 | Polymer C | 0 | 4 | 21.14 | 0.69 | 0.69 | 0.69 | 60 | −10 | |
| 4 | Polymer D | | 1.22 | 29.36 | 0.62 | 0.62 | 0.62 | 0 | 0 | No stretch |
| 5 | Polymer E | 0 | 7.92 | 18.46 | 0.66 | 0.65 | 0.655 | 56 | −8 | |
| 6 | Polymer F | 0 | 0.85 | 23.26 | 0.63 | 0.63 | 0.63 | 56 | −8 | |
| 7 | Polymer G | 0 | 4.3 | 20.86 | 0.65 | 0.65 | 0.65 | 44 | −8 | |
| 8 | Polymer H | 2.68 | 0.75 | 19.39 | 0.65 | | 0.65 | 60 | −12 | |
| 9 | Polymer I | 0 | 2.18 | 21.47 | 0.57 | 0.57 | 0.57 | 52 | −8 | |
| 10 | Polymer J | 0 | 2.21 | 22.37 | 0.64 | | 0.64 | 60 | −10 | |
| 11 | Polymer K | 0 | 1.4 | 35.4 | 0.57 | | 0.57 | 0 | 0 | No stretch |

When evaluating shrink films used for packaging, it is common to look at a set of shrink curves (TD and MD) to understand its aggressiveness to shrink at certain temperatures, its ultimate shrinkage at 125° C. and the action of the film in the machine direction to see if it shrinks or grows in the MD. For example, PVC will normally have a softer, less aggressive early TD shrinkage at lower temperatures, an ultimate shrinkage of less than 70% and will also shrink in the MD direction. This means that when using PVC film with the intension of labeling a bottle for instance, the label must be cut taller than the anticipated final post shrinkage height due to MD shrinkage.

Copolyester films made from NPG base will commonly shrink aggressively in the TD at lower temperatures, have high ultimate shrinkage but will also have MD shrinkage in most cases. Polymer M film as described below, however, will have an aggressive early shrinkage, high ultimate shrinkage but will also have good and measurable MD growth which means that a label can actually be cut shorter than the intended final height due to the MD growth. Polymer M will also will have a lower shrink force than typical NPG formulations.

OPS (oriented polystyrene) films are commonly used for shrink films due to their softer early TD shrinkage performance, it's reasonably high ultimate shrinkage as well as has good MD growth. However. OPS also has a much lower Tg than copolyesters as well as has very low shrink force. These characteristics will enable OPS shrink films to sometimes prematurely shrink before the intended application to the package and therefore are commonly unstable and unpredictable. The low shrink force may also permit the label to rotate around a bottle instead of staying fixed in place as is desired.

When evaluating oriented film comprising Polymer A-C and E-J, the shrink properties in the TD direction were delayed or shifted to the right on a TD shrink curve. It was unpredictable that the oriented Polymer A-C and E-J film also produced growth in the MD direction. Polymer M film will produce limited but still valuable percentages of MD growth at less than 5% at 95° C. where the DEG content of between 8 to 10 mole %. When evaluating Polymers A-C and E-J, it was discovered that MD growth occurs at various levels in a wide range of TMCD content between 7-23 mole %, see Table 1 above. Films that are produced from Polymers A-C and E-J when stretched and shrunk in the manner described herein have a good shrink curve, shrinkage at 95° C. ranging from 20% to 55%, even higher ultimate shrinkage at higher air temperatures (100° C.-125° C.) as well as important MD growth of as much as 12% at or above 95° C. It is believed that there is no other shrink film available commercially that has these unique properties. The combination of the shrink properties as well as the improved temperature resistance due to increased Tg should offer new commercial options, including but not limited to, battery films, hot fill bottles, industrial applications, as well as for other shrink film applications where increased temperature stability is desirable.

Examples 12-22

The polymers shown in Table 3 were blends of polymers which resulted in the same compositional data as is shown in Table 1. Reference is made to Table 1 for the compositional data for these polymers. All pellet blends were dried overnight. The film samples in Table 5 were extruded internally on a line at 250-micron thickness. Below are the extrusion conditions (shown in Table 2) used to produce the test film samples in Tables 1 and 3 herein.

TABLE 2

| Internal Extrusion Conditions | |
|---|---|
| EXTRUSION CONDITIONS | VALUE |
| Ext. Zone 1, ° C. | 255 |
| Ext. Zone 2, ° C. | 260 |
| Ext. Zone 3, ° C. | 260 |
| Ext. Zone 4, ° C. | 260 |
| Adaptor, ° C. | 260 |
| Screen Changer, ° C. | 260 |
| Die Zone 1, ° C. | 260 |
| Die Zone 2, ° C. | 260 |
| Die Zone 3, ° C. | 260 |
| Screw Speed, RPM | 41 |
| Motor Load Amps | 23 |
| Melt Pressure, psi | 550 |
| Melt Temperature, ° C. | 250 |
| Middle Roll Temp, ° C. | 77 |
| Bottom Roll Temp, ° C. | 79 |
| Line Speed, m/min | 2.2 |
| Bottom Roll Speed | 2.1 |
| Film Gauge, microns | 250 |
| Film Width (cm) | 30 |
| Drying Temp, ° C. | 65 |
| Roll Size, meters | 12 |

Polymers A-K were further evaluated for how they performed with tenter frame stretching and shrinkage afterwards to evaluate their shrinkage properties. Polymers D and K fractured during stretching and the shrinkage data was unable to be obtained as shown in Table 3, Example 15 and 22. For the remaining polymers, in Table 3, optimal sets of shrink curves would demonstrate MD growth or lack of shrinkage and a gradual TO shrinkage during the early portion of the curve. A rapidly changing curve with a very steep slope will usually manifest itself in the film as causing wrinkles and will be very difficult to manage during application and shrinkage around the intended product for packaging. Polymer F (Example 17) and Polymer J (Example 21) were the best examples in Table 3 below. See FIGS. 1 and 2 herein, respectively, to view the shrink curve data in graph form for Polymer F and Polymer J. Table 3 documents all of the test samples (Polymers A-C and E-J, Examples 12-14, 16-21) that were evaluated for shrinkage percentages in the TD and MD directions and are followed by the corresponding shrink curves. The compositions and nomenclature (letter designation) are identical to those in Table 1.

TABLE 3

| SHRINKAGE % | POLYMER | | | | | | | | | | |
|---|---|---|---|---|---|---|---|---|---|---|---|
| | A | B | C | D* | E | F | G | H | I | J | K* |
| | Example | | | | | | | | | | |
| | Ex. 12 | Ex. 13 | Ex. 14 | Ex. 15 | Ex. 16 | Ex. 17 | Ex. 28 | Ex. 19 | Ex. 20 | Ex. 21 | Ex. 22 |
| TD@ 80° C. | 1 | 2 | 4 | No data | 6 | 1 | 1 | 1 | 2 | 1 | No data |
| TD@ 85° C. | 6 | 3 | 18 | | 16 | 2 | 4 | 2 | 3 | 3 | |
| TD@ 90° C. | 18 | 12 | 39 | | 36 | 4 | 15 | 10 | 14 | 10 | |
| TD@ 95° C. | 34 | 40 | 49 | | 46 | 24 | 35 | 30 | 44 | 33 | |
| TD@ 100° C. | 54 | 54 | 58 | | 52 | 44 | 48 | 48 | 53 | 52 | |
| TD@ 105° C. | 60 | 62 | 60 | | 57 | 60 | 55 | 56 | 63 | 62 | |
| TD@ 110° C. | 61 | 67 | 61 | | 58 | 70 | 58 | 58 | 67 | 66 | |
| TD@ 115° C. | 50 | 68 | 65 | | 60 | 72 | 60 | 60 | 69 | 72 | |
| TD@ 120° C. | 55 | 72 | 66 | | 60 | 73 | 62 | 62 | 69 | 71 | |
| TD@ 125° C. | 51 | 72 | 66 | | 60 | 73 | 62 | 62 | 70 | 73 | |
| MD@ 80° C. | 0 | 0 | 0 | | 0 | 0 | 0 | 0 | 0 | 0 | |
| MD@ 85° C. | −1 | 0 | −6 | | −3 | 0 | 0 | 0 | −1 | 0 | |
| MD@ 90° C. | −2 | −2 | −9 | | −8 | 0 | −3 | −1 | −5 | −1 | |
| MD@ 95° C. | −9 | −8 | −11 | | −10 | −3 | −7 | −4 | −14 | −6 | |
| MD@ 100° C. | −14 | −11 | −12 | | −10 | −9 | −10 | −9 | −16 | −10 | |
| MD@ 105° C. | −12 | −9 | −10 | | −10 | −10 | −8 | −6 | −12 | −8 | |
| MD@ 110° C. | −8 | −8 | −10 | | −10 | −4 | −8 | −6 | −10 | −5 | |
| MD@ 115° C. | −6 | −4 | −6 | | −8 | −3 | −8 | −4 | −10 | −2 | |
| MD@ 120° C. | −6 | −4 | −8 | | −6 | 0 | −5 | −2 | −5 | −2 | |
| MD@ 125° C. | −4 | −4 | −4 | | −10 | −3 | −4 | −2 | −5 | 0 | |

Polymers D and K would not stretch without fracture so no shrinkage data was able to be obtained Cast films were then produced from Polymer A-Polymer K on an internal line and were stretched on a Bruckner Karo 4 tenter frame at a 5:1 stretch ratio to a thickness of 50 microns with the oven temperature set at 114° C. and a dwell time of 10 seconds. These curves were generated by soaking stretched film samples in heated water at the corresponding temperatures from 80 to 95° C. Samples tested from 100 to 125° C. were done so using a hot oven at the appropriate temperatures for 15 minutes. Samples were cut precisely, measured and placed in an oven while in an envelope to restrain the sample from moving inside convection oven while at the same time being free to shrink in the envelope itself.

Example 25

Polymer L (similar to Polymer J) was produced on a line in the plant and then was extruded and stretched elsewhere on a tenter frame on a large scale continuous basis. The extrusion and tenter frame conditions were as follows in Table 9.

The material extruded and stretched very well with very few adjustments being required to capture film for testing internally. It is unusual for new material to extrude and stretch well without having to make several adjustments initially. Film composition testing was performed on Polymer L with the results below, Table 4. The final shrink film made from Polymer L had an L* value of 95.89, a b* value of 0.48, and an a* value of 0.04 determined by using the color determination method for film as described herein.

TABLE 4

| Example 23-Polymer L POLYMER L | | |
|---|---|---|
| ANALYSIS | COMPONENT | RESULT |
| IV | IV-inherent viscosity | 0.595 |
| NMR | Ethylene Glycol (EG), Mole % | 75.57 |
| | Diethylene Glycol (DEG), Mole % | 2.24 |
| | TMCD, Mole % | 22.19 |
| | Glycol, Mole % | 100.0 |

The data in Table 5 for Polymer L at 80 to 95° C. was generated by soaking stretched film samples in heated water at the corresponding temperatures from 80 to 95° C., at 10 second durations. Ten second intervals are typical in the industry. Samples for Polymer L were also tested from 100 to 125° C. as shown in Table 5 were done so using a hot oven at the appropriate temperatures for 15 minutes. Samples were cut precisely, measured and placed in an oven while in an envelope to restrain the sample from moving inside convection oven while at the same time being free to shrink in the envelope itself. It should be noted that shrinkage data in Table 5 for Polymer L was measured at all temperatures specified in the oven. Polymer L had a composition that was easy to produce a good shrink film from. See the shrink curves for Polymer J in FIG. 2 which is similar in composition to Polymer L which demonstrates that a shrink curve for Polymer L would likely also demonstrate good shrink properties.

TABLE 5

Shrinkage Data For Polymer L, Example 23

| Temperature | 80° C. | 85° C. | 90° C. | 95° C. | 100° C. | 105° C. | 110° C. | 115° C. | 120° C. | 125° C. |
|---|---|---|---|---|---|---|---|---|---|---|
| Transverse Direction | | | | | | | | | | |
| Shrinkage % | 2 | 21 | 47 | 65 | 71 | 76 | 77 | 78 | 79 | 78 |
| Machine Direction | | | | | | | | | | |
| Shrinkage % | 0 | 0 | −9 | −10 | −4 | −2 | 0 | 2 | 3 | 4 |

Shrink force was also measured with an Oakland Instruments shrink force tester. The results for Polymers L, Example 23 (composition described in Table 5) are shown as follows in Table 7. Polymer M, Example 24 was evaluated as well for comparison purposes. The composition of Polymer M, Example 24, and the data therefrom results are listed under Table 7 below.

TABLE 6

Example 23, Polymer L

| TRIAL | FILM THICKNESS | SHRINK FORCE (psi) | SHRINK FORCE (MPa) |
|---|---|---|---|
| 1 | 0.00185 | 2016.216216 | 13.907370 |
| 2 | 0.00190 | 1931.578947 | 13.323562 |
| 3 | 0.00190 | 1963.157895 | 13.541386 |
| 4 | 0.00185 | 2021.621622 | 13.944655 |
| 5 | 0.00195 | 1928.205128 | 13.300290 |
| | | | 13.603453 |

TABLE 7

Example 24-Polymer M

| TRIAL | FILM THICKNESS | SHRINK FORCE (psi) | SHRINK FORCE (MPa) |
|---|---|---|---|
| 1 | 0.00195 | 1471.794872 | 10.152083 |
| 2 | 0.00205 | 1360.975610 | 9.387679 |
| 3 | 0.00210 | 1309.523810 | 9.032777 |
| 4 | 0.00210 | 1314.285714 | 9.065623 |

TABLE 7-continued

Example 24-Polymer M

| TRIAL | FILM THICKNESS | SHRINK FORCE (psi) | SHRINK FORCE (MPa) |
|---|---|---|---|
| 5 | 0.00210 | 1366.666667 | 9.426935 |
| | | | 9.413019 |

*Polymer M is a PETG composition commercially available from Eastman.

These results show Polymer L, Example 23, (Table 6) has considerably higher shrink force than Polymer M, Example 24, (Table 7).

Film tensile properties were also tested for Polymer L (Example 23) and Polymer M (Example 24), using ASTM 0882 with the results being listed below in Table 8. Film properties were also tested for Polymer M film and the results are also listed in the table for comparison. It was anticipated that due to the increased Tg of Polymer L that the film modulus was be increased which would supply end use customers with potentially a stiffer film. However, this was not the case. It should be noted that multiple film stretching speeds (300 and 500 mm/min) were used to evaluate the films. As can be seen, films will respond differently as tested depending on the testing speed. Again however, the modulus values at comparable speeds were very similar and therefore supply no stiffness advantages for Polymer L.

TABLE 8

| EXAMPLE | ORIENTATION | DIMENSION | MEAN YIELD STRESS MPA | MEAN YIELD STRAIN % | MEAN BREAK STRESS MPA | MEAN BREAK STRAIN % | MEAN YOUNGS MODULUS MPA | MEAN ENERGY @ BREAK N*MM/MM^3 | MEAN SECANT MODULUS AT STRAIN POINT 1 MPA |
|---|---|---|---|---|---|---|---|---|---|
| Example 23 | MD | 300 mm/min | 48.8 | 5.5 | 37.7 | 162 | 2169 | 56.4 | 1862 |
| | MD | 500 mm/min | 51.2 | 5.5 | 42.8 | 129 | 1870 | 46.1 | 1849 |
| | TD | 300 mm/min | 174.1 | 7.4 | 260.0 | 19 | 5010 | 34.6 | 4703 |
| | TD | 500 mm/min | 170.2 | 7.4 | 259.7 | 20 | 4778 | 35.8 | 4745 |
| Example 24 | MD | 300 mm/min | 47.3 | 4.0 | 44.9 | 443 | 1742 | 130.4 | 1633 |
| | MD | 500 mm/min | 51.5 | 4.5 | 25.4 | 36 | 1839 | 10.5 | 1814 |
| | TD | 300 mm/min | 146.4 | 9.3 | 269.0 | 38 | 5076 | 71.1 | 4699 |
| | TD | 500 mm/min | 148.0 | 8.7 | 261.1 | 37 | 4814 | 67.1 | 4761 |

TABLE 9

Extrusion Conditions for Polymer L Film, Example 23

| | | |
|---|---|---|
| Tenter | Preheat ° F. | 220° F., (104° C.) |
| | Stretch ° F. | 220° F., (104° C.) |
| | Anneal ° F. | 220° F., (104° C.) |
| Stretch | 1 | 10 |
| Frame setpt. | 2 | 8.5 |
| | 3 | 9 |
| | 4 | 42.5 |
| | 5 | 42.5 |
| | 6 | 42.5 |
| | 7 | 41.5 |
| St. Ratio | | 5.0 |
| Ratio w/relax | | 4.9 |
| Line Speed fpm | | 45 |
| Extrusion | Z1 ° F. | 490, (254° C.) |
| | Z2 ° F. | 500, (260° C.) |
| | Z3 ° F. | 525, (274° C.) |
| | Z4 ° F. | 525, (274° C.) |
| | Z5 ° F. | 525, (274° C.) |
| | Adpt ° F. | 510, (266° C.) |
| | Die ° F. | 510, (266° C.) |
| | Melt temp ° F. | 506, (262° C.) |
| | Ext psi | 227, (15.7 bar) |
| | Motor trq % | 49 |
| Screw | RMP | 32 |
| | Die psi | 248, (17.1 bar) |
| Roll | 1 | 70° F., (21° C.) |
| | 2 | 70° F., (21° C.) |
| Extrusion A | Z1 | 490° F., (254° C.) |
| | Z2 | 525° F., (274° C.) |
| | Z3 | 525° F., (274° C.) |
| | Melt temp ° F. | 512° F., (267° C.) |
| | Ext psi | 287, (19.8 bar) |
| | Motor trq % | 45 |
| Screw | RPM | 20 |
| Extrusion C | Z1 ° F. | 490° F., (254° C.) |
| | Z2 ° F. | 525° F., (274° C.) |
| | Z3 ° F. | 525° F., (274° C.) |
| | Melt temp ° F. | 519° F., (271° C.) |
| | Ext psi | 252, (17.4 bar) |
| | Motor torque % | 45 |
| Screw | RMP-revolutions per minute | 20 |

Listed in Table 9 are the extrusion and tenter frame conditions used to extrude and stretch Polymer L film. The linespeed was 45 feet per minute (13.7 meters per minute). The cast film gauge was 250 microns and the stretched film thickness was 50 microns.

It can be clearly seen from a comparison of the data in the above relevant working examples that the shrink films of the invention have at least one or more of the following properties: higher shrink activation temperatures, good stretching properties, good shrink force, good break stress and strain, good Young's modulus, good shrinkage properties in the transverse direction, good growth in the machine direction, and/or good ultimate shrinkage (shrinkage at the highest temperature, e.g. at 125° C.).

It can also be seen from a comparison of the data in the above relevant working examples that the shrink films of the invention have at least one or more of the following properties: certain properties including those above and/or at least one of the following desirable shrink film properties: (1) a relatively higher shrinkage activation temperature, (2) a shrinkage percentage which increases gradually and in a controlled manner with increasing temperature, (3) a higher shrink force but low enough to prevent crushing of the underlying container, (4) a high ultimate shrinkage (for example, 60% or greater in the transverse direction), and (5) film toughness so as to prevent unnecessary fracturing, breaking, tearing, splitting, bubbling, or wrinkling of the film prior to and after shrinkage.

The invention has been described in detail with reference to the embodiments described herein, but it will be understood that variations and modifications can be effected within the scope of the invention.

What is claimed is:

1. A shrink film comprising a polyester composition comprising:
    (1) at least one polyester which comprises:
        (a) a dicarboxylic acid component comprising:
            about 80 to about 100 mole % of terephthalic acid residues;
            (ii) about 0 to about 20 mole % of aromatic and/or aliphatic dicarboxylic acid residues having up to 20 carbon atoms; and
        (b) a glycol component comprising:
            (i) about 10 to about 42 mole % 2,2,4,4-tetramethyl-1,3-cyclobutanediol residues; and
            (ii) about 58 to about 90 mole % ethylene glycol residues;
            (iii) optionally, less than 20 mole % 1,4-cyclohexanedimethanol residues, and
            (iv) optionally, diethylene glycol residues;
    wherein the total mole % of the dicarboxylic acid component is 100 mole %, and
    wherein the total mole % of the glycol component is 100 mole %;
    wherein the inherent viscosity of the polyester is from 0.50 to 0.8 dL/g as determined in 60/40 (wt/wt) phenol/tetrachloroethane at a concentration of 0.25 g/50 ml at 25° C.;
    wherein the polyester has a Tg of 80° C. to less than 100° C. or of 80° C. to 98° C. as determined using a TA DSC 2920 from Thermal Analyst Instrument at a scan rate of 20° C./min.; and wherein said at least one polyester comprises a catalyst/stabilizer component which comprises: (i) titanium atoms in the range of 10-50 ppm based on total polymer weight, and (ii) phosphorus atoms in the range of 10-200 ppm based on total polymer weight; and wherein the catalyst/stabilizer component comprises at least one phosphorus compound chosen from at least one of the following: alkyl phosphate esters, aryl phosphate esters, trialkyl phosphates, triaryl phosphates, alkyl diaryl phosphates, dibutylphenyl phosphate, diphenyl phosphate, tricresyl phosphate, tributyl phosphate, tri-2-ethylhexyl phosphate, trioctyl phosphate, isocetyl diphenyl phosphate, phosphate esters, 2-ethylhexyl diphenyl phosphate, and mixed alkyl aryl phosphates; and wherein the shrink film has transverse direction shrinkage of from about 20% to 70% and from 2% shrinkage in the machine direction to 15% growth in the machine direction when immersed in water at 95° C. for 10 seconds, or wherein the shrink film shrinks no more than 30% in the transverse direction per 5° C. temperature increase increment.

2. A shrink film comprising a polyester composition comprising:
    (1) at least one polyester which comprises:
        (a) a dicarboxylic acid component comprising:
            (i) about 80 to about 100 mole % of terephthalic acid residues;
            (ii) about 0 to about 20 mole % of aromatic and/or aliphatic dicarboxylic acid residues having up to 20 carbon atoms; and (b) a glycol component comprising:
(i) about 10 to about 29 mole % 2,2,4,4-tetramethyl-1,3-cyclobutanediol residues; and
(ii) about 71 to about 90 mole % ethylene glycol residues; and
(iii) optionally, diethylene glycol residues; or
(b) a glycol component comprising:
(i) about 14 to about 29 mole % 2,2,4,4-tetramethyl-1,3-cyclobutanediol residues;
(ii) about 71 to about 86 mole % ethylene glycol residues;
(iii) optionally, diethylene glycol residues, and
wherein the total mole % of the dicarboxylic acid component is 100 mole %, and
wherein the total mole % of the glycol component is 100 mole %;
wherein the inherent viscosity of the polyester is from 0.50 to 0.8 dL/g as determined in 60/40 (wt/wt) phenol/tetrachloroethane at a concentration of 0.25 g/50 ml at 25° C.;
wherein the polyester has a Tg of 80° C. to 105° C. or of 80° C. to 100° C., as determined using a TA DSC 2920 from Thermal Analyst Instrument at a scan rate of 20° C./min.; and wherein said at least one polyester comprises a catalyst/stabilizer component which comprises: (i) titanium atoms in the range of 10-50 ppm based on total polymer weight, and (ii) phosphorus atoms in the range of 10-200 ppm based on total polymer weight; and wherein the catalyst/stabilizer component comprises at least one phosphorus compound chosen from at least one of the following: alkyl phosphate esters, aryl phosphate esters, trialkyl phosphates, triaryl phosphates, alkyl diaryl phosphates, dibutylphenyl phosphate, triphenyl phosphate, tricresyl phosphate, tributyl tri-2-ethylhexyl phosphate, trioctyl phosphate, isocetyl diphenyl phosphate, phosphate esters, 2-ethylhexyl diphenyl phosphate, and mixed alkyl aryl phosphates; and wherein the shrink film has transverse direction shrinkage of from about 20% to 70% and from 2% shrinkage in the machine direction to 15% growth in the machine direction when immersed in water at 95° C. for 10 seconds, or wherein the shrink film shrinks no more than 30% in the transverse direction per 5° C. temperature increase increment.

3. The film of claim 2 wherein said polyester comprises about 15 to about 28 mole % 2,2,4,4-tetramethyl-1,3-cyclobutanediol residues and 72 to 85 mole % ethylene glycol residues.

4. The shrink film of claim 1, wherein said at least one polyester comprises manganese atoms in the range of 10-100 ppm based on total polymer weight.

5. The shrink film of claim 1, wherein the catalyst/stabilizer component comprises tin atoms in the range of 0-5 ppm based on total polymer weight.

6. The shrink film of claim 1 or 2, wherein the inherent viscosity of the polyester is from 0.50 to 0.70 dL/g or 0.55 to 0.68 dL/g.

7. The shrink film of claim 1 or 2, comprising at least one voiding agent.

8. The shrink film of claim 1 or 2, which is oriented in one or more directions.

9. The shrink film of claim 8 which has a pre-oriented thickness of about 100 to 400 microns and which is oriented on a tenter frame at from a ratio of 5:1 to 3:1 at a temperature of from 100° C. to 125° C. or at a temperature from 104° C. to 114° C. to a thickness of from about 20 to about 80 microns.

10. The shrink film of claim 1 or 2, wherein the L* color value for the film is 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) transmittance mode with specular angle included, (4) large area view, (5) 1" port size, and where the measurements were performed on film.

11. The shrink film of claim 1 or 2, wherein the film has a Young's modulus of from 1500 to 5000 MPa at stretching speeds of from 300 mm/minute to 500 mm/minute in the transverse direction according to ASTM Method D882.

12. The shrink film of claim 1 or 2, wherein the film has a Young's modulus of from 1500 to 2300 MPa at stretching speeds of from 300 mm/minute to 500 mm/minute in the machine direction according to ASTM Method D882.

13. The shrink film of claim 1 having a shrink initiation temperature of from about 70° C. to about 90° C., or about 70° C. to about 85° C., or about 75° C. to about 85° C., or about 70° C. to about 80° C.

14. The shrink film of claim 1 or 2, wherein the polyester composition comprises at least one additive chosen from colorants, mold release agents, phosphorus compounds other than those described in claim 1, plasticizers, nucleating agents, UV stabilizers, glass fiber, carbon fiber, fillers, impact modifiers, or a mixture thereof.

15. A label or a sleeve applied to an article of manufacture, a shaped article, a container, a plastic bottle, a glass bottle, packaging, a battery, a hot fill container, or an industrial article comprising the shrink film of claim 1.

* * * * *